(12) United States Patent
Deng et al.

(10) Patent No.: US 12,431,482 B2
(45) Date of Patent: Sep. 30, 2025

(54) SILICON OXIDE BASED HIGH CAPACITY ANODE MATERIALS FOR LITHIUM ION BATTERIES

(71) Applicant: Zenlabs Energy, Inc., Fremont, CA (US)

(72) Inventors: Haixia Deng, Fremont, CA (US); Yongbong Han, San Francisco, CA (US); Charan Masarapu, Fremont, CA (US); Yogesh Kumar Anguchamy, Newark, CA (US); Herman A. Lopez, Sunnyvale, CA (US); Sujeet Kumar, Newark, CA (US)

(73) Assignee: Ionblox, Inc., Fremont, CA (US)

( * ) Notice: Subject to any disclaimer, the term of this patent is extended or adjusted under 35 U.S.C. 154(b) by 0 days.

(21) Appl. No.: 17/720,047

(22) Filed: Apr. 13, 2022

(65) Prior Publication Data
US 2022/0246902 A1 Aug. 4, 2022

Related U.S. Application Data

(63) Continuation of application No. 15/425,696, filed on Feb. 6, 2017, which is a continuation of application
(Continued)

(51) Int. Cl.
*H01M 4/131* (2010.01)
*H01B 1/12* (2006.01)
(Continued)

(52) U.S. Cl.
CPC ............ *H01M 4/131* (2013.01); *H01B 1/122* (2013.01); *H01M 4/134* (2013.01); *H01M 4/136* (2013.01);
(Continued)

(58) Field of Classification Search
CPC ...... H01M 4/131; H01M 4/134; H01M 4/136; H01M 4/386; H01M 4/483; H01M 4/505;
(Continued)

(56) References Cited

U.S. PATENT DOCUMENTS

| 4,086,404 A | 4/1978 | Vissers et al. |
| 4,945,014 A | 7/1990 | Miyabayashi et al. |

(Continued)

FOREIGN PATENT DOCUMENTS

| EP | 2079120 A1 | 7/2009 |
| EP | 2141759 A1 | 1/2010 |

(Continued)

OTHER PUBLICATIONS

Achiha et al., "Electrochemical Behavior of Nonflammable Organo-Fluorine Compunds for Lithium Ion Batteries," Journal of the Electrochemical Society 156(6): A483-A488 (2009).
(Continued)

*Primary Examiner* — Matthew W Van Oudenaren
(74) *Attorney, Agent, or Firm* — Christensen, Fonder, Dardi PLLC; Peter S. Dardi; Elizabeth A. Gallo

(57) ABSTRACT

Silicon oxide based materials, including composites with various electrical conductive compositions, are formulated into desirable anodes. The anodes can be effectively combined into lithium ion batteries with high capacity cathode materials. In some formulations, supplemental lithium can be used to stabilize cycling as well as to reduce effects of first cycle irreversible capacity loss. Batteries are described with surprisingly good cycling properties with good specific capacities with respect to both cathode active weights and anode active weights.

20 Claims, 27 Drawing Sheets

Related U.S. Application Data

No. 13/108,708, filed on May 16, 2011, now Pat. No. 9,601,228.

(51) Int. Cl.

| | | |
|---|---|---|
| *H01M 4/02* | (2006.01) | |
| *H01M 4/134* | (2010.01) | |
| *H01M 4/136* | (2010.01) | |
| *H01M 4/38* | (2006.01) | |
| *H01M 4/48* | (2010.01) | |
| *H01M 4/505* | (2010.01) | |
| *H01M 4/525* | (2010.01) | |
| *H01M 4/583* | (2010.01) | |
| *H01M 4/62* | (2006.01) | |
| *H01M 10/052* | (2010.01) | |
| *H01M 10/0525* | (2010.01) | |
| *H01M 10/0569* | (2010.01) | |

(52) U.S. Cl.
CPC ........... *H01M 4/386* (2013.01); *H01M 4/483* (2013.01); *H01M 4/505* (2013.01); *H01M 4/525* (2013.01); *H01M 4/583* (2013.01); *H01M 10/052* (2013.01); *H01M 10/0525* (2013.01); *H01M 10/0569* (2013.01); *H01M 2004/027* (2013.01); *H01M 4/622* (2013.01); *H01M 4/624* (2013.01); *H01M 4/625* (2013.01)

(58) Field of Classification Search
CPC ...... H01M 4/525; H01M 4/583; H01M 4/622; H01M 4/624; H01M 4/625; H01M 4/1395; H01M 10/052; H01M 10/0525; H01M 10/0569; H01M 2004/027
See application file for complete search history.

(56) References Cited

U.S. PATENT DOCUMENTS

| | | |
|---|---|---|
| 5,147,739 A | 9/1992 | Beard |
| 5,162,176 A | 11/1992 | Herr et al. |
| 5,395,711 A | 3/1995 | Tahara et al. |
| 5,436,093 A | 7/1995 | Huang et al. |
| 5,541,022 A | 7/1996 | Mizumoto et al. |
| 5,543,601 A | 8/1996 | Bartrug et al. |
| 5,595,837 A | 1/1997 | Olsen et al. |
| 5,721,067 A | 2/1998 | Jacobs et al. |
| 5,743,921 A | 4/1998 | Nazri et al. |
| 5,753,388 A | 5/1998 | Koksbang et al. |
| 5,792,577 A | 8/1998 | Ejiri et al. |
| 5,948,569 A | 9/1999 | Moses et al. |
| 6,025,093 A | 2/2000 | Herr |
| 6,083,644 A | 7/2000 | Watanabe et al. |
| 6,235,427 B1 | 5/2001 | Idota et al. |
| 6,251,822 B1 | 6/2001 | Peng et al. |
| 6,335,115 B1 | 1/2002 | Meissner |
| 6,528,208 B1 | 3/2003 | Thackeray et al. |
| 6,638,662 B2 | 10/2003 | Kaneda et al. |
| 6,645,671 B2 | 11/2003 | Tsutsumi et al. |
| 6,677,082 B2 | 1/2004 | Thackeray et al. |
| 6,680,143 B2 | 1/2004 | Thackeray et al. |
| 6,699,336 B2 | 3/2004 | Turner et al. |
| 6,706,447 B2 | 3/2004 | Gao et al. |
| 6,737,191 B2 | 5/2004 | Gan et al. |
| 6,759,160 B2 | 7/2004 | Fukuoka et al. |
| 6,884,546 B1 | 4/2005 | Fujita et al. |
| 6,893,621 B2 | 5/2005 | Fukuoka et al. |
| 6,899,970 B1 | 5/2005 | Rogers et al. |
| 6,979,513 B2 | 12/2005 | Kelley et al. |
| 7,037,581 B2 | 5/2006 | Aramata et al. |
| 7,195,842 B1 | 3/2007 | Fujimoto et al. |
| 7,205,072 B2 | 4/2007 | Kang et al. |
| 7,235,330 B1 | 6/2007 | Fujimoto et al. |
| 7,252,907 B2 | 8/2007 | Takeuchi et al. |
| 7,276,314 B2 | 10/2007 | Gao et al. |
| 7,297,446 B2 | 11/2007 | Fukui et al. |
| 7,432,015 B2 | 10/2008 | Jeong et al. |
| 7,435,402 B2 | 10/2008 | Kang et al. |
| 7,452,632 B2 | 11/2008 | Lee et al. |
| 7,514,369 B2 | 4/2009 | Li et al. |
| 7,517,614 B2 | 4/2009 | Jeong et al. |
| 7,563,541 B2 | 7/2009 | Howard et al. |
| 7,575,830 B2 | 8/2009 | Kawamura et al. |
| 7,582,387 B2 | 9/2009 | Howard et al. |
| 7,588,623 B2 | 9/2009 | Dover et al. |
| 7,615,314 B2 | 11/2009 | Kawakami et al. |
| 7,658,863 B2 | 2/2010 | Aramata et al. |
| 7,754,389 B2 | 7/2010 | Yamaguchi et al. |
| 7,776,473 B2 | 8/2010 | Aramata et al. |
| 7,790,316 B2 | 9/2010 | Aramata et al. |
| 7,833,662 B2 | 11/2010 | Kim et al. |
| 7,851,085 B2 | 12/2010 | Obrovac et al. |
| 7,871,727 B2 | 1/2011 | Obrovac et al. |
| 7,923,150 B2 | 4/2011 | Yamamoto et al. |
| 2002/0164479 A1 | 11/2002 | Matsubara et al. |
| 2003/157407 A1 | 8/2003 | Kosuzu et al. |
| 2003/0215711 A1* | 11/2003 | Aramata ............... H01M 4/625 252/502 |
| 2004/0023117 A1 | 2/2004 | Imachi et al. |
| 2004/0033419 A1 | 2/2004 | Funabiki |
| 2004/0076885 A1* | 4/2004 | Sato ................... H01M 50/429 361/526 |
| 2004/0214085 A1 | 10/2004 | Sheem et al. |
| 2005/0031963 A1* | 2/2005 | Im ..................... H01M 10/0569 429/200 |
| 2005/0196670 A1* | 9/2005 | Yamaguchi ....... H01M 10/0569 429/200 |
| 2005/0214644 A1* | 9/2005 | Aramata ............... H01M 4/133 252/502 |
| 2005/0233213 A1 | 10/2005 | Lee et al. |
| 2006/0188784 A1 | 8/2006 | Sudoh et al. |
| 2007/0059601 A1 | 3/2007 | Natsume et al. |
| 2007/0099436 A1 | 5/2007 | Kogetsu et al. |
| 2007/0148549 A1 | 6/2007 | Kobayashi et al. |
| 2007/0190413 A1 | 8/2007 | Lee et al. |
| 2007/0207381 A1 | 9/2007 | Ohtsuka et al. |
| 2007/0224508 A1 | 9/2007 | Aramata et al. |
| 2007/0254102 A1 | 11/2007 | Fukuoka et al. |
| 2008/0131783 A1 | 6/2008 | Choi et al. |
| 2008/0193831 A1 | 8/2008 | Mah et al. |
| 2009/0004564 A1 | 1/2009 | Ishida et al. |
| 2009/0023065 A1 | 1/2009 | Hwang et al. |
| 2009/0047577 A1 | 2/2009 | Iwamoto et al. |
| 2009/0092899 A1 | 4/2009 | Treger |
| 2009/0117466 A1 | 5/2009 | Zhamu et al. |
| 2009/0130562 A1 | 5/2009 | Mao et al. |
| 2009/0169994 A1 | 7/2009 | Mah et al. |
| 2009/0239151 A1* | 9/2009 | Nakanishi ............. H01M 4/386 427/78 |
| 2009/0263707 A1* | 10/2009 | Buckley ............... H01M 50/417 429/231.95 |
| 2009/0305131 A1 | 12/2009 | Kumar et al. |
| 2009/0317722 A1 | 12/2009 | Natanabe |
| 2010/0009261 A1 | 1/2010 | Watanabe |
| 2010/0015533 A1 | 1/2010 | Deguchi et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0120179 A1 | 5/2010 | Zhamu et al. |
| 2010/0151332 A1 | 6/2010 | Lopez et al. |
| 2010/0159366 A1 | 6/2010 | Shao-Horn et al. |
| 2010/0173198 A1 | 7/2010 | Zhamu et al. |
| 2010/0178566 A1 | 7/2010 | Kogetsu et al. |
| 2010/0243951 A1 | 9/2010 | Watanabe et al. |
| 2010/0288970 A1 | 11/2010 | Watanabe et al. |
| 2010/0330430 A1 | 12/2010 | Chung et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0111294 A1 | 5/2011 | Lopez et al. |
| 2011/0111298 A1 | 5/2011 | Lopez et al. |
| 2011/0111303 A1 | 5/2011 | Kung et al. |

(56) References Cited

U.S. PATENT DOCUMENTS

| | | | |
|---|---|---|---|
| 2011/0111304 A1* | 5/2011 | Cui | H01M 4/70 429/231.95 |
| 2011/0136019 A1 | 6/2011 | Amiruddin et al. | |
| 2011/0171529 A1* | 7/2011 | Kono | H01M 10/0525 429/223 |
| 2011/0239446 A1* | 10/2011 | Morishima | H01M 4/1393 29/623.5 |
| 2012/0028105 A1 | 2/2012 | Kumar et al. | |
| 2012/0045670 A1 | 2/2012 | Stefan et al. | |
| 2012/0056590 A1 | 3/2012 | Amiruddin et al. | |
| 2012/0070725 A1 | 3/2012 | Venkatachalam et al. | |
| 2012/0105007 A1 | 5/2012 | Amiruddin et al. | |
| 2012/0107680 A1 | 5/2012 | Amiruddin et al. | |
| 2012/0121982 A1 | 5/2012 | Harimoto et al. | |
| 2015/0086873 A1 | 3/2015 | Hotta et al. | |
| 2016/0006021 A1 | 1/2016 | Lopez et al. | |
| 2016/0079591 A1 | 3/2016 | Yang et al. | |
| 2017/0194627 A1 | 7/2017 | Deng et al. | |

FOREIGN PATENT DOCUMENTS

| | | | |
|---|---|---|---|
| JP | 2001-118568 | | 4/2001 |
| JP | 2008153117 | * | 7/2008 |
| JP | 2010-055775 | | 3/2010 |
| KR | 10-0493960 B1 | | 6/2005 |
| KR | 2012-0073603 A | | 7/2012 |
| WO | WO2010/050491 | * | 5/2010 |
| WO | WO2010073924 | * | 7/2010 |
| WO | WO2010116839 | * | 10/2010 |

OTHER PUBLICATIONS

Choi et al., "Effect of fluoroethylene carbonate additive on interfacial properties of silicon thin-film electrode" Journal of Power Sources 161 (2006) 1254-1259. (Abstract only).

Hu et al., "Superior Storage Performance of a Si@SiOx/C Nanocomposite as Anode Material for Lithium-Ion Batteries," Agnewandte Chemie International Edition, 2008, 47, 1645-1649, available Feb. 2008.

Hua-Chao Tao, "Interweaved Si@SiOx/C nanoporous spheres as anode materials for Li-ion batteries", Solid State onics 220, Publish 2012, p. 1-6.

Ishikawa et al., "Li-ion Battery Performance with FSI-based Ionic Liquid Electrolyte and Fluorinated Solvent-based Electrolyte" ECS Trans. 33:29-36 (2010) (Abstract).

Jeong et al., "A Nanostructured SiAl0.20 Anode Material for Lithium Batteries," Chem. Mater. 22:5570-5579 (2010).

Kim et al., "Three-Dimensional Porous Silicon Particles for Use in High-Performance Lithium Secondary Batteries." Angew. Chem. Int. Ed. 2008, 47, 10151-10154, (Year 2008).

Magasinki et al., "High-performance lithium-ion anodes using a hierarchical bottom-up approach." Nature Materials, vol. 9, pp. 353-358, Apr. 2010.

Mcmillan et al. "Fluoroethylene carbonate electrolyte and its use in lithium ion batteries with graphite anodes," Journal of Power Sources 81-2: 20-26 (1999) (Abstract).

Naoi et al., "Nonflammable Hydrofluoroether for Lithium-Ion Batteries: Enhanced Rate Capability, Cyclability, and Low-Temperature Performance," J. Electrochem. Soc. 156(4):A272-A276 (2009) (Abstract only).

Profatilova et al., "Enhanced thermal properties of the solid electrolyte interphase formed on graphite in an electrolyte with fluoroethylene carbonate," Electrochimica Acta 54: 4445-4450 (2009).

Veluchamy et al., "A new SiO/C Anode Composition for Lithium-ion Battery." Journal of Power Sources 179 (2008) 367-370, published Dec. 2007.

Wang et al., "Nano-sized SiOx-/C Composite Anode for Lithium Ion Batteries." Journal of Power Sources 196 (2011) 4811-4815 available Jan. 2011.

Yamaki et al., "Characterization and Thermal Stability of SEI between a Graphite Electrode and Methyl Difluoroacetate-based Electrolyte," Abstract #236 from the 210th Meeting of the Electrochemical Society (2006).

Yang et al., "SiOx-based anodes for secondary lithium batteries." Solid State Ionics 152-153 (2002) 125-129, available Mar. 2002.

International Search Report and Written Opinion for corresponding PCT Application No. PCT/US 2012/037761, mailed Sep. 19, 2012 (13 pages).

* cited by examiner

SILICON OXIDE BASED HIGH CAPACITY ANODE MATERIALS FOR LITHIUM ION BATTERIES

CROSS REFERENCE TO RELATED APPLICATIONS

This application is a continuation of copending U.S. patent application Ser. No. 15/425,696, filed Feb. 6, 2017 to Haixia Deng et al., entitled "Silicon Oxide Based High Capacity Anode Materials For Lithium Ion Batteries", which is a continuation of Ser. No. 13/108,708 filed May 16, 2011, to Haixia Deng et al., entitled "Silicon Oxide Based High Capacity Anode Materials For Lithium Ion Batteries", issued Mar. 21, 2017 as U.S. patent number U.S. Pat. No. 9,601,228 B2, incorporated herein by reference.

GOVERNMENT RIGHTS

Development of the inventions described herein was at least partially funded with government support through U.S. Department of Energy grant ARPA-E-DE-AR0000034, and the U.S. government has certain rights in the inventions.

FIELD OF THE INVENTION

The invention relates to high capacity negative electrode active materials based on silicon oxide for lithium ion batteries. The invention further relates to batteries formed with silicon and/or silicon oxide based negative electrode active materials and high capacity lithium rich positive electrode active materials as well as to silicon and/or silicon oxide-based lithium ion batteries with a supplemental lithium source.

BACKGROUND

Lithium batteries have been used in various applications due to their high energy density. For some current commercial batteries, the negative electrode material can be graphite, and the positive electrode materials can comprise of lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

New positive electrode active materials are presently under development that can significantly increase the corresponding energy density and power density of the corresponding batteries. Particularly promising positive electrode active materials are based on lithium rich layered-layered compositions. In particular, the improvement of battery capacities can be desirable for vehicle applications, and for vehicle applications the maintenance of suitable performance over a large number of charge and discharge cycles is important.

SUMMARY OF THE INVENTION

In a first aspect, the invention pertains to a lithium ion battery comprising a positive electrode comprising a lithium metal oxide, a negative electrode, a separator between the positive electrode and the negative electrode, and extractable supplemental lithium wherein the negative electrode comprises silicon oxide based active material.

In a further aspect, the invention pertains to a lithium ion battery comprising a positive electrode comprising a lithium metal oxide, a negative electrode, and a separator between the positive electrode and the negative electrode, wherein the negative electrode comprises silicon oxide based active material. The negative electrode can comprise of a polymer binder having an elongation of at least about 50% without tearing and a tensile strength of at least about 100 MPa.

In another aspect, the invention pertains to a lithium ion battery comprising a positive electrode comprising a lithium metal oxide, a negative electrode comprising a silicon oxide based active material, and a separator between the positive electrode and the negative electrode, wherein after 50 charge-discharge cycles between 4.5V and 1.0V, the battery exhibits at least about 750 mAh/g discharge capacity from negative electrode active material and at least about 150 mAh/g discharge capacity from positive electrode active material at a rate of C/3.

In additional aspects, the invention pertains to a composite composition comprising silicon oxide with the structure of $SiO_x$, $0.1 \leq x \leq 1.9$ and anode-inert elemental metal.

In other aspects, the invention pertains to a lithium ion battery comprising a positive electrode comprising a lithium metal oxide, a negative electrode, a separator between the positive electrode and the negative electrode, and an electrolyte comprising lithium ions and a halogenated carbonate, wherein the negative electrode comprises silicon oxide based active material. The battery can exhibit a discharge capacity that decreases by no more than about 15 percent at the 50th discharge cycle relative to the 7th discharge cycle when discharged at a rate of C/3 from the 7th discharge to the 50th discharge.

Furthermore, the invention pertains to a lithium ion battery comprising a positive electrode comprising a lithium metal oxide, a negative electrode, and a separator between the positive electrode and the negative electrode, wherein the negative electrode comprises silicon oxide based active material having a specific capacity of at least about 1000 mAh/g at a rate of C/3 based on anode's mass.

DETAILED DESCRIPTION OF PREFERRED EMBODIMENTS

Figure 1:
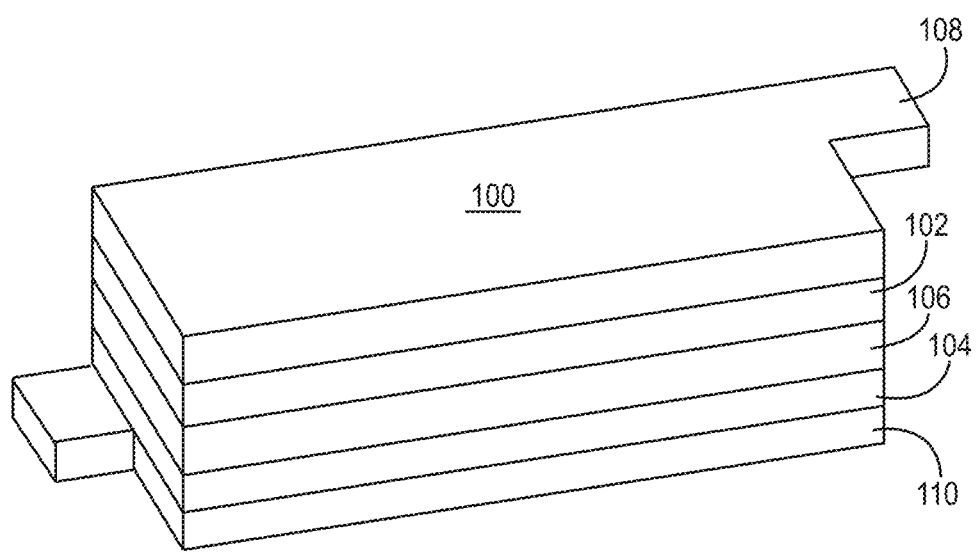
FIG. 1 is a schematic perspective view of a battery stack with a cathode, an anode, and a separator between the cathode and anode.

Silicon oxide based compositions have been formed into composite materials with high capacities and very good cycling properties. In particular, oxygen deficient silicon oxides can be formed into composites with electrically conductive materials, such as conductive carbons or metal powders, which surprisingly significantly improve cycling while providing for high values of specific capacity. Furthermore, the milling of the silicon oxides into smaller particles, such as submicron structured materials, can further improve the performance of the materials. The silicon oxide based materials maintain their high capacities and good cycling as negative electrode active materials when placed into lithium ion batteries with high capacity lithium metal oxide positive electrode active materials. The cycling can be further improved with the addition of supplemental lithium into the battery and/or with an adjustment of the balance of the active materials in the respective electrodes. Supplemental lithium can replace at least some of the lithium lost to the irreversible capacity loss due to the negative electrode and can stabilize the positive electrode with respect to cycling. Based on appropriate designs of the batteries, high energy density batteries can be produced, and the batteries are suitable for a range of commercial applications.

As with silicon, oxygen deficient silicon oxide, e.g., silicon oxide, $SiO_x$, $0.1 \leq x \leq 1.5$, can intercalate/alloy with lithium such that the oxygen deficient silicon oxide can perform as an active material in a lithium based battery. The oxygen deficient silicon oxide can incorporate a relatively large amount of lithium such that the material can exhibit a large specific capacity. However, silicon oxide is observed generally to have a capacity that fades quickly with battery cycling, as is observed with elemental silicon. The composite materials described herein can significantly address the cycling fade of the silicon oxide based materials. In particular, composites can be formed with electrically conductive components that contribute to the conductivity of the electrode as well as the stabilization of the silicon oxide during cycling.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into its structure through intercalation, alloying or similar mechanisms. The positive electrode of a lithium based battery generally comprises an active material that reversibly intercalates/alloys with lithium, e.g., a metal oxide. Lithium ion batteries generally refer to batteries in which the negative electrode active material is also a lithium intercalation/alloying material.

If elemental lithium metal itself is used as the anode or negative electroactive material, the resulting battery generally is referred to as a lithium battery. Lithium batteries can initially cycle with good performance, but dendrites can form upon lithium metal deposition that eventually can breach the separator and result in failure of the battery. As a result, commercial lithium-based secondary batteries have generally avoided the deposition of lithium metal through the use of a negative electrode active material that operates through intercalation/alloying or the like and with a slight excess in negative electrode capacity relative to the cathode or positive electrode to maintain the battery from lithium plating on the anode. If the negative electrode comprises a lithium intercalation/alloying composition, the battery can be referred to as a lithium ion battery.

The batteries described herein are lithium based batteries that use a non-aqueous electrolyte solution which comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Similarly, during charge, reduction takes place at the anode (negative electrode) where lithium ions are taken up and electrons are consumed, and during discharge, oxidation takes place at the anode with lithium ions and electrons being released. Unless indicated otherwise, performance values referenced herein are at room temperature. As described below some of the testing of the silicon oxide based active materials is performed in lithium and lithium ion batteries. Generally, the lithium ion batteries are formed with lithium ions in the positive electrode material such that an initial charge of the battery transfers a significant fraction of the lithium from the positive electrode material to the negative electrode material to prepare the battery for discharge.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the battery due to changes in the battery materials during the initial cycle.

The silicon oxide based materials exhibit a large irreversible capacity loss, as described further below. In some embodiments, the battery can comprise supplemental lithium, which can compensate for the irreversible capacity loss of the silicon oxide based materials as well as to surprisingly stabilize the cycling of the battery. The supplemental lithium can replace some or all of the active lithium removed from the cycling as a result of the irreversible capacity loss of the silicon oxide based material. In a traditional lithium ion battery, the lithium for cycling is supplied only by a positive electrode active material comprising lithium. The battery is initially charged to transfer lithium from the positive electrode to the negative electrode where it is then available for discharge of the battery. Supplemental lithium results from a supply of active lithium other than the positive electrode active material. It has also been found that supplemental lithium can be very effective for the stabilization of lithium rich high capacity positive electrode active materials. See, copending U.S. patent application Ser. No. 12/938,073 now U.S. Pat. No. 9,166,222 to Amiruddin et al., entitled, "Lithium Ion Batteries With Supplemental Lithium," (hereinafter "the '073 patent application") incorporated herein by reference. Thus, good cycling has been obtained for realistic lithium ion batteries with supplemental lithium to have relatively high specific capacities. Supplemental lithium, for example, can be supplied by elemental lithium, lithium alloys, a sacrificial lithium source or through electrochemical lithiation of the negative electrode prior to completion of the ultimate battery.

Silicon oxide based materials with greater capacity upon cycling can be produced through the milling of the silicon oxide to form smaller particles. In further embodiments, the silicon oxide based materials can be formed into composites with electrically conductive powders in combination with high energy mechanical milling (HEMM) or the like. Alternatively or additionally, the silicon oxide based materials can be subjected to high temperature heat treatment. Smaller silicon oxide particles obtained from HEMM treatment has shown greater capacity in either silicon oxide electrode or electrodes with composites of silicon oxide-conductive carbon particle, e.g., graphitic carbon, than commercial silicon oxides with larger particle sizes. Pyrolytic carbon coated silicon oxide composites showed improved conductivity and specific capacity. Silicon oxide composites with inert metal particles with or without a pyrolytic carbon coating have shown very good cycling performance at high specific capacity. Suitable inert metal particles are described further below. The milling of the silicon oxide based materials with metal powders seems to reduce the introduction of inert material from the grinding medium, e.g., zirconium oxide, into the product composite. Composites of silicon oxide, graphite, and pyrolytic carbon in particular have shown significantly improved specific capacity and cycling performance.

HEMM and/or heat treatment under appropriate conditions can result in some disproportionation of oxygen deficient silicon oxides into $SiO_2$ and elemental Si. Small crystalline silicon peaks are observed under some processing conditions. It is possible that the processed materials have some components of amorphous elemental silicon and/or small crystallites within the structure. However, it is believed that most of the silicon oxide based materials herein have significant components of oxygen deficient silicon oxide and amounts of elemental silicon have not been quantified. In additional embodiments, elemental silicon powders, such as submicron silicon particles, can be included in the formation of composites with silicon oxide based materials. In general, a range of composites are described herein, and these can be summarized as $\alpha SiO\text{-}\beta Gr\text{-}\chi HC\text{-}\delta M\text{-}\varepsilon CNF\text{-}\phi Si$ within ranges of relative weights, as described further below. As used herein, the reference to composites implies application of significant combining forces, such as from HEMM milling, to intimately associate the materials, in contrast with simple blending, which is not considered to form composites.

When configured with high capacity lithium rich manganese oxides based positive electrodes, the silicon oxide based electrode can exhibit excellent cycling at reasonable rates. New electrolyte with fluorinated additives has shown to further improve the battery performance. High loading density electrodes with silicon oxide based active materials can be achieved, for example, using a polyimide binder.

Lithium rich layered-layered metal oxides have been found to cycle with relatively high specific capacities as a positive electrode active material. These layered-layered materials are looking very promising for commercial applications as a new generation of high capacity positive electrode active material. The overall performance of the battery is based on the capacities of both the negative and positive electrodes and their relative balance. An improvement in the specific capacity of the negative electrode active material can be more significant in the context of overall battery design when a higher capacity positive electrode active material is used in the battery. Having a high capacity cathode material means that using only a fraction of the weight of a high capacity cathode in a battery can result in the same energy density as a LiCoO$_2$ battery. Using less cathode material to obtain the same performance reduces the price and weight of the battery. From this perspective, the combination of the lithium rich layered-layered positive electrode active material with high capacity silicon oxide based negative electrode active material can provide particularly desirable overall battery performance.

Supplemental lithium can replace lithium that does not cycle due to an irreversible capacity loss of the negative electrode. Furthermore, it has been discovered that the inclusion of supplemental lithium can stabilize positive electrodes based on lithium rich layered-layered lithium metal oxide compositions. In particular, for these lithium rich metal oxides, the supplemental lithium can stabilize the capacity of the positive electrode compositions out to large number of cycles. This improvement in cycling of the positive electrode active material is described further in the copending '073 patent application.

The layered-layered lithium metal oxides, which provide a relatively large specific capacity, exhibit a significant irreversible capacity loss associated with changes to the material during the initial charge of the battery. Irreversible capacity loss associated with the positive electrode may result in lithium that can get deposited in the negative electrode but which cannot be later intercalated into the positive electrode active material. This excess lithium from the positive electrode is separate from any supplemental lithium introduced into the battery since the battery is assembled with the lithium metal oxide fully loaded with lithium pending the initial charge of the battery.

The supplemental lithium can be provided to the negative electrode in various ways. In particular suitable approaches include, for example, introducing elemental lithium into the battery, the incorporation of a sacrificial material with active lithium that can be transferred to the negative electrode active material, or preloading of lithium into the negative electrode active material. After the initial charge, supplemental lithium is associated with the negative electrode active material although a portion of the lithium can be associated with irreversible reaction byproducts, such as the solid electrolyte interphase (SEI) layer.

The introduction of elemental lithium in association with the anode, i.e., negative electrode, can be an appropriate way to introduce supplemental lithium. In particular, elemental lithium powder or foil can be associated with the negative electrode to supply the supplemental lithium. In some embodiments, an elemental lithium powder can be placed on the surface of the electrode or on the surface of the current collector. A supplemental lithium source, such as elemental lithium, within the negative electrode generally may initiate reaction with the silicon oxide based active material upon contact of the electrode with electrolyte since the reaction is spontaneous as long as electrical conductivity is supported within the electrode structure.

In alternative or additional embodiments, a supplemental lithium source can be associated with the positive electrode, i.e., cathode, or with a separate sacrificial electrode. If a supplemental lithium source is associated with the positive electrode or a separate sacrificial electrode, current flows between the electrode with the supplemental lithium and the negative electrode to support the respective half reactions that ultimately results in the placement of the supplemental lithium within the negative electrode active material, with possibly a fraction of the supplemental lithium being consumed in side reactions, such as formation of an SEI layer or other reactions leading to irreversible capacity loss.

In further embodiments, the supplemental lithium can be placed into the negative electrode active material prior to construction of the battery. For example, prior to assembly of the battery, supplemental lithium can be inserted into the active material through electrochemical intercalation/alloying. To perform the electrochemical deposition, the silicon oxide based electrode can be assembled into a structure with electrolyte and the supplemental lithium source, such as lithium foil. If the elemental lithium is in electrical contact with the active material in the presence of electrolyte, the reaction of the elemental lithium with the active alloying/intercalation material can occur spontaneously. Alternatively, the structure can be assembled into a cell with electrolyte and a separator separating the silicon oxide based electrode and an electrode with the supplemental lithium, such as a lithium foil. Current flow through the cell can be controlled to provide for the lithium incorporation into the silicon oxide based electrode. In such a configuration, the silicon oxide based electrode functions as a positive electrode of a lithium cell. This cell can be cycled a few times to complete any formation of an SEI layer as well as any other initial irreversible changes to the electrode, prior to the deposition of a desired amount of supplemental lithium into the electrode for transfer to the ultimate battery. After deposition of a desired amount of lithium, the silicon oxide based electrode can be taken and assembled into the ultimate lithium ion battery.

For graphitic carbon based electrodes associated with supplemental lithium, the electrodes are found to have extractable lithium after essentially fully discharging the batteries having a lithium metal oxide positive electrode active material after cycling for relatively large numbers of cycles. The lithium is supplied in the batteries from the positive electrode active material as well as the supplemental lithium. This residual lithium is found to stabilize the battery cycling when used with lithium rich positive electrode active materials. Also, the amount of residual lithium is found to gradually diminish with larger numbers of cycles. See the '073 patent application referenced above. Based on the measurements for the graphitic carbon electrodes, it is anticipated that the silicon oxide based electrodes with supplemental lithium can similarly exhibit residual lithium that can be extracted from the electrodes after discharging the battery with a lithium metal oxide positive electrode.

Silicon oxide has attracted significant amount of attention as a potential negative electrode material due to its high specific capacity with respect to intake and release of lithium and promising cycling properties. See, for example, published U.S. patent application 2004/0033419 to Funabiki, entitled "Negative Electrode Active Material, Negative Electrode Using the Same, Non-Aqueous Electrolyte Battery Using the Same, and Method for Preparing the Same," incorporated herein by reference. It was further recognized that association of conductive carbon with the silicon oxide active material can improve the performance of the silicon oxide material in a lithium ion battery. Composites with electrically conductive materials and silicon oxide active material described herein provide very good cycling performance.

As described herein, high energy milling is used to fracture silicon oxide particles to a smaller size. The results herein suggest that the smaller particles can cycle significantly better, perhaps due to the ability of the smaller particles to accommodate volume changes of the particles over cycling of the materials. The milling process can incorporate electrically conductive diluents to form an intimate composite through the milling process. Graphitic carbon, e.g., nanostructured conductive carbon, can provide a good electrically conductive medium for the formation of composites with silicon oxide. Furthermore, it has been found that metal particles provide desirable milling properties as well as a suitable electrically conductive diluent for the formation of corresponding composites. In particular, it has been found that milling with metal powders can provide for the use of desirable milling conditions while obtaining reduced amounts of milling media within the product composite. High energy milling can generally be performed with a hard ceramic milling media, such as zirconium oxide particles. Milling can result in the incorporation of some milling media into the product composite material. Since the milling media is electrically insulating and electrochemically inert, it is desirable to keep the amount of milling media in the product composite material, after separation of the bulk quantities of milling beads, to a low or possibly undetectable level.

The objective for the design of improved silicon oxide based materials is to further stabilize the negative electrode materials over cycling while maintaining a high specific capacity. Thus, high energy milling can be performed to form composites with electrically conductive materials. As described herein, pyrolytic carbon coatings are also observed to stabilize silicon oxide based materials with respect to battery performance. In particular, the pyrolytic carbon coatings can be placed over the initially prepared composites to provide an additional electrically conductive component of the product material. The combination of the pyrolytic carbon with a silicon oxide-particulate conductor composite provides surprisingly improved performance in some embodiments.

With respect to the composite materials, silicon oxide components can be combined with, for example, carbon nanoparticles and/or carbon nanofibers. The components can be, for example, milled to form the composite, in which the materials are intimately associated. Generally, it is believed that the association has a mechanical characteristic, such as the carbon coated over or mechanically affixed with the silicon oxide materials. In additional or alternative embodiments, the silicon oxide can be milled with metal powders, in which the silicon oxide is milled to a smaller particle size and the metal is intimately combined with the silicon oxide material to form a composite material, for example with a nanostructure. The carbon components can be combined with the silicon-metal alloys to form multi-component composites. The composite materials with intimately combined components are distinguishable from simple blends of components held together with a polymer binder, which lacks mechanical and/or chemical interactions to form a single composite material.

Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon oxide based component. The dispersion can be well mixed with silicon oxide based composition. After drying the mixture to remove the solvent, the dried mixture can be heated in an oxygen free atmosphere to pyrolyze the organic composition, such as organic polymers, some lower molecular solid organic compositions and the like, and to form a carbon coating. The carbon coating can lead to surprisingly significant improvement in the capacity of the resulting material. Also, environmentally friendly organic compositions, such as sugars and citric acid, can be used as desirable precursors for the formation of pyrolytic carbon coatings. In some embodiments, organic polymers can be blended with the silicon oxide based materials for thermal processing to form pyrolytic carbon. In further embodiments, elemental metal coatings, such as silver or copper, can be applied as an alternative to a pyrolytic carbon coating to provide electrical conductivity and to stabilize silicon oxide based active material. The elemental metal coatings can be applied through solution based reduction of a metal salt.

The silicon oxide based materials can be incorporated into suitable electrode structures generally with a suitable polymer binder and optionally mixed with electrically conductive powders. It has been found that polyimide binders are particularly desirable for silicon oxide based materials. The high capacity silicon oxide based materials are of particular value in combination with a high capacity positive electrode active material. Traditionally, the anode and cathode are relatively balanced so that the battery does not involve significant waste with associated cost of unused electrode capacity as well as for the avoidance of corresponding weight and volume associated with unused electrode capacity. With the materials described herein, it can be possible to get high capacity results simultaneously for both electrodes in the lithium ion battery. Furthermore, cycling capacity of both electrodes can independently fade, and the capacities of both electrodes are subject to irreversible capacity loss, and approaches to address both of these issues are described herein. The positive electrodes with lithium rich layered-layered compositions can exhibit a significant first cycle irreversible capacity loss. However, high capacity silicon oxide based anodes can generally exhibit contributions to IRCL significantly greater than the positive electrode active material.

The positive electrode active material can be designed to reduce IRCL associated with the positive electrode, such as with a coating applied to the positive electrode active material. Furthermore, supplemental lithium can be used as a substitute for additional capacity of the positive electrode to compensate for the relatively large IRCL of the negative electrode. The supplemental lithium can compensate for the large IRCL of the negative electrode. Thus, if the supplemental lithium is selected to appropriately compensate for the negative electrode IRCL, the remaining observed IRCL can be attributed to the positive electrode active material. With appropriate stabilization of the negative electrode and positive electrode, a battery with high capacity materials in both electrodes can exhibit high specific capacities for both electrodes over at least a moderate number of cycles.

To achieve cycling of the battery without lithium plating, the negative electrode generally is balanced to at least about 100% of the positive electrode capacity. The electrode capacities are evaluated independently against a lithium metal electrode, as described further below. On the other hand, for embodiments with supplemental lithium, the supplemental lithium can be designed to compensate for the IRCL such that the cycling capacities of the negatives electrode and positive electrode can be roughly balanced or with some excess negative electrode capacity, although a greater amount of supplemental lithium can be used if desired.

Improved performance of silicon oxide based batteries is also observed with the addition of a halogenated carbonates as an additive to the electrolyte. For example, fluoroethylene carbonate (FEC) has been proposed to improve the safety of batteries due to its nonflammability, to expand the operating cell voltage due to its high oxidation resistance, to improve cycle performance by forming an electrochemically stable SEI that included LiF and silicon (Si) fluorides on a Si-based anode, and many other advantages [1-6]. 1. R. McMillan, H. Slegr, Z. X. Shu, and W. Wang, *J. Power Sources*, 81, 20 (1999). 2. N.-S. Choi, K. H. Yew, K. Y. Lee, M. Sung, H. Kim, and S.-S. Kim, *J. Power Sources*, 161, 1254 (2006). 3. I. A. Profatilova, S.-S. Kim, and N.-S. Choi, *Electrochim. Acta*, 54, 4445 (2009). 4. T. Achiha, T. Nakajima, Y. Ohzawa, M. Koh, A. Yamauchi, M. Kagawa, and H. Aoyama, *J. Electrochem. Soc.*, 156, A483 (2009). 5. J. Yamaki, S. Yamami, T. Doi, and S. Okada, *Electrochem. Soc.*, 602, 263 (2006). 6. K. Naoi, E. Iwama, N. Ogihara, Y. Nakamura, H. Segawa, and Y. Ino, *J. Electrochem. Soc.*, 156, A272 (2009). A halogenated carbonate additive has been found to provide surprisingly significant improvement in the performance of the batteries based on silicon oxide active materials.

Lithium Ion Battery Structure

Lithium ion batteries generally comprise a positive electrode (cathode), a negative electrode (anode), a separator between the negative electrode and the positive electrode and an electrolyte comprising lithium ions. The electrodes are generally associated with metal current collectors, such as metal foils. Lithium ion batteries refer to batteries in which the negative electrode active material is a material that takes up lithium during charging and releases lithium during discharging. Referring to FIG. 1, a battery 100 is shown schematically having a negative electrode 102, a positive electrode 104, and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The basic battery structures and compositions are described in this section and modifications related to incorporation of supplemental lithium are described further below.

The nature of the positive electrode active material and the negative electrode active material influences the resulting voltage of the battery since the voltage is the difference between the half cell potentials at the cathode and anode. Suitable positive electrode active materials are described below, and the materials of particular interest are lithium metal oxides. In general, suitable negative electrode lithium intercalation/alloying compositions can include, for example, graphite, synthetic graphite, coke, fullerenes, other graphitic carbons, niobium pentoxide, tin alloys, silicon, silicon oxide, silicon alloys, silicon-based composites, titanium oxide, tin oxide, and lithium titanium oxide, such as $Li_xTiO_2$, $0.5<x\leq1$ or $Li_{1+x}Ti_{2-x}O_4$, $0\leq x\leq 1/3$. Graphitic carbon and metal oxide negative electrode compositions take up and release lithium through an intercalation or similar process. Silicon and tin alloys form alloys with the lithium metal to take up lithium and release lithium from the alloy to correspondingly release lithium. Negative electrode active materials of particular interest herein are silicon oxide based materials described in detail below. In general, if the battery does not include supplemental lithium, the positive electrode and negative electrode are balanced such that the capacities of the negative electrode active material is from about 100 to about 110 percent of the capacity of the positive electrode active material. The positive electrode active material capacity can be estimated from the theoretical capacity of the material, and the negative electrode capacity can be measured by cycling the material against lithium metal foil. The balancing of the battery when supplemental lithium is present is described further below.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example sodium carboxy methyl cellulose (CMC), polyvinylidine fluoride (PVDF), polyimide, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. In particular, thermally curable polyimide polymers have been found desirable, which may be due to their high mechanical strength. Table I provides suppliers of polyimide polymers, and names of corresponding polyimide polymers.

TABLE I

| Supplier | Binder |
|---|---|
| New Japan Chemical Co., Ltd. | Rikacoat PN-20 |
|  | Rikacoat EN-20 |
|  | Rikacoat SN-20 |
| HD MicroSystems | PI-2525 |
|  | PI-2555 |
|  | PI-2556 |
|  | PI-2574 |
| AZ Electronic Materials | PBI MRS0810H |
| Ube Industries. Ltd. | U-Varnish S |
|  | U-Varnish A |
| Maruzen Petrochemical Co., Ltd. | Bani-X (Bis-allyl-nadi-imide) |
| Toyobo Co., Ltd. | Vyromax HR16NN |

With respect to polymer properties, some significant properties for electrode application are summarized in Table II.

TABLE II

| Binder | Elongation(%) | Tensile Strength (MPa) | Elastic Modulus (psi) | Viscosity (P) |
|---|---|---|---|---|
| PVDF | 5-20 | 31-43 | 160000 | 10-40 |
| Polyimide | 70-100 | 150-300 |  | 40-60 |
| CMC | 30-40 | 10-15 |  | 30 |

The elongation refers to the percent elongation prior to tearing of the polymer. In general, to accommodate the silicon oxide based materials, it is desirable to have an elongation of at least about 50% and in further embodiments at least about 70%. Similarly, it is desirable for the polymer binder to have a tensile strength of at least about 100 MPa and in further embodiments at least about 150 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. The particle loading in the binder can be large, such as greater than about 80 weight percent up to about 97 percent or more. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. While the negative electrode can comprise an electrically conductive material incorporated into the composite, the negative electrode can further comprise an electrically conductive material that is simply blended into the blend with the polymer such that the additional conductor is not intimately combined with the silicon oxide. With respect to the blended electrically conductive compositions, the negative electrode can comprise from about 1 weight percent to about 30 weight percent additional conductor and in further embodiments from about 2 weight percent to about 15 weight percent additional electrical conductor. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used. Particularly useful electrolytes for high voltage lithium-ion batteries are described further in copending U.S. patent application Ser. No. 12/630,992 filed on Dec. 4, 2009 now U.S. Pat. No. 8,993,177 to Amiruddin et al. (the '992 application), entitled "Lithium Ion Battery With High Voltage Electrolytes and Additives," incorporated herein by reference.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, y-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in the copending '992 application.

Additives to the electrolytes can further provide performance improvements. In particular, the performance of silicon oxide based batteries can have significant performance improvements with the addition of halogenated carbonates to the electrolyte. Suitable halogenated carbonates include, for example, fluoroethylene carbonate ($C_3H_3FO_3$), fluorinated vinyl carbonate, monochloro ethylene carbonate, monobromo ethylene carbonate, 4-(2,2,3,3-tetrafluoropropoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl) carbonate, bis(2,2,3,3,3-pentafluoro-propyl) carbonate, mixtures thereof and the like. Note that ethylene carbonate is also known by its IUPAC name of 1,3-dioxolan-2-one. In general, the electrolyte can comprise from about 1 volume percent to about 35 volume percent halogenated carbonate, in further embodiments from about 2 volume percent to about 30 volume percent and in other embodiments from about 3 volume percent to about 25 volume percent halogenated carbonate in the electrolyte. A person of ordinary skill in the art will recognize that additional ranges of halogenated carbonate concentrations within the explicit ranges above are contemplated and are within the present disclosure. As described further in the Examples below, the incorporation of halogenated carbonate into the electrolyte has been observed to significantly improve the specific capacity and the cycling properties of batteries incorporating silicon oxide active materials.

The electrodes described herein can be incorporated into various commercial battery designs, such as prismatic shaped batteries, wound cylindrical batteries, coin batteries or other reasonable battery shapes. The batteries can comprise a single electrode stack or a plurality of electrodes of each charge assembled in parallel and/or series electrical connection(s). Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used. Pouch batteries can be constructed as described in published U.S. patent application 2009/0263707 to Buckley et al, entitled "High Energy Lithium Ion Secondary Batteries", incorporated herein by reference.

Positive Electrode Active Compositions

In general, the lithium ion battery positive electrode materials can be any reasonable positive electrode active material, such as stoichiometric layered cathode materials with hexagonal lattice structures, such as $LiCoO_2$, $LiNiO_2$, $LiMnO_2$, $Li(CoNiMn)_{1/3}O_2$, $Li(CoNiMnAl)_{1/4}O_2$ or the like; cubic spinel cathode materials such as $LiMn_2O_4$, $LiNi_{0.5}Mn_{1.5}O_4$, $Li_4Mn_5O_{12}$, or the like; olivine $LiMPO_4$ (M=Fe, Co, Mn, combinations thereof and the like) type materials; layered cathode materials such as $Li_{1+x}(NiCoMn)_{0.33-x}O_2$ ($0 \leq x < 0.3$) systems; layer-layer composites, such as $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In additional or alternative embodiments, a lithium rich composition can be referenced relative to a composition $LiMO_2$, where M is one or more metals with an average oxidation state of +3. Generally, the lithium rich compositions can be represented approximately with a formula $Li_{1+x}M_{1-y}O_{2-z}F_z$ where M is one or more metal elements, x is from about 0.01 to about 0.33, y is from about x−0.2 to about x+0.2 with the proviso that y≥0, and z is from 0 to about 0.2. In the layered-layered composite compositions, x is approximately equal to y. In general, the additional lithium in the lithium rich compositions is accessed at higher voltages such that the initial charge takes place at a relatively higher voltage to access the additional capacity.

Lithium rich positive electrode active materials of particular interest can be represented approximately by a formula $Li_{1+b}Ni_\alpha Mn_\beta Co_\gamma A\delta O_{2-z}F_z$, where b ranges from about 0.01 to about 0.3, a ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure. To simplify the following discussion in this section, the optional fluorine dopant is not discussed further. Desirable lithium rich compositions with a fluorine dopant are described further in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in published U.S. patent application 2011/0052989 to Venkatachalam et al., entitled "Lithium Doped Cathode Material," incorporated herein by reference. The specific performance properties obtained with +2 metal cation dopants, such as $Mg^{+2}$, are described in copending U.S. patent application Ser. No. 12/753,312 now U.S. Pat. No. 8,741,484 to Karthikeyan et al., entitled "Doped Positive Electrode Active Materials and Lithium Ion Secondary Batteries Constructed Therefrom," incorporated herein by reference.

If b+α+β+γ+δ approximately equals to 1, the positive electrode material with the formula above can be represented approximately in two component notation as x $Li_2M'O_3 \cdot (1-x)LiMO_2$ where 0<x<1, M is one or more metal cations with an average valance of +3 within some embodiments at least one cation being a Mn ion or a Ni ion and where M' is one or more metal cations with an average valance of +4 such as $Mn^{+4}$. It is believed that the layered-layered composite crystal structure has a structure with the excess lithium supporting the stability of the material. For example, in some embodiments of lithium rich materials, a $Li_2MnO_3$ material may be structurally integrated with a layered $LiMO_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," incorporated herein by reference.

Recently, it has been found that the performance properties of the positive electrode active materials can be engineered around the specific design of the composition stoichiometry. The positive electrode active materials of particular interest can be represented approximately in two component notation as x $Li_2MnO_3$ (1-x) $LiMO_2$, where M is one or more metal elements with an average valance of +3 and with one of the metal elements being Mn and with another metal element being Ni and/or Co. In general, 0<x<1, but in some embodiments 0.03≤x≤0.55, in further embodiments 0.075<x<0.50, in additional embodiments 0.1≤x≤0.45, and in other embodiments 0.15≤x≤0.425. A person of ordinary skill in the art will recognize that additional ranges within the explicit ranges of parameter x above are contemplated and are within the present disclosure. For example, M can be a combination of nickel, cobalt and manganese, which, for example, can be in oxidation states $Ni^2$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

In some embodiments, M can be written as $Ni_u Mn_v Co_w A_y$. For embodiments in which y=0, this simplifies to $Ni_u Mn_v Co_w$. If M includes Ni, Co, Mn, and optionally A the composition can be written alternatively in two component notation and single component notation as the following.

$$xLi_2MnO_3 \cdot (1-x)LiNi_u Mn_v Co_w A_y O_2, \quad (1)$$

$$Li_{1+b}Ni_\alpha Mn_\beta Co_\gamma A_\delta O_2, \quad (2)$$

with u+v+w+y≈1 and b+α+β+γ+δ≈1. The reconciliation of these two formulas leads to the following relationships:

$$b = x/(2+x),$$

$$\alpha = 2u(1-x)/(2+x),$$

$$\beta = 2x/(2+x) + 2v(1-x)/(2+x),$$

-continued
$$\gamma = 2w(1-x)/(2+x),$$
$$\delta = 2y(1-x)/(2+x),$$

and similarly, $$x = 2b/(1-b),$$
$$u = \alpha/(1-3b),$$
$$v = (\beta - 2b)/(1-3b),$$
$$w = \gamma/(1-3b),$$
$$y = \delta/(1-3b),$$

In some embodiments, it may be desirable to have $u \approx v$, such that $LiNi_uMn_vCo_wA_yO_2$ becomes approximately $LiNi_uMn_uCo_wA_yO_2$. In this composition, when y=0, the average valance of Ni, Co and Mn is +3, and if $u \approx v$, then these elements can have valances of approximately $Ni^{+2}$, $Co^{+3}$ and $Mn^{+4}$ to achieve the average valance. When the lithium is hypothetically fully extracted, all of the elements go to a +4 valance. A balance of Ni and Mn can provide for Mn to remain in a +4 valance as the material is cycled in the battery. This balance avoids the formation of $Mn^{+3}$, which has been associated with dissolution of Mn into the electrolyte and a corresponding loss of capacity.

In further embodiments, the composition can be varied around the formula above such that $LiNi_{u+\Delta}Mn_{u-\Delta}Co_wA_yO_2$, where the absolute value of $\Delta$ generally is no more than about 0.3 (i.e., $-0.3 \leq \Delta \leq 0.3$), in additional embodiments no more than about 0.2 ($-0.2 \leq \Delta \leq 0.2$) in some embodiments no more than about 0.175 ($-0.175 \leq \Delta \leq 0.175$) and in further embodiments no more than about 0.15 ($-0.15 \leq \Delta \leq 0.15$). Desirable ranges for x are given above. With $2u+w+y \approx 1$, desirable ranges of parameters are in some embodiments $0 \leq w \leq 1$, $0 \leq u \leq 0.5$, $0 \leq y \leq 0.1$ (with the proviso that both $u+\Delta$ and w are not zero), in further embodiments, $0.1 \leq w \leq 0.6$, $0.1 \leq u \leq 0.45$, $0 \leq y \leq 0.075$, and in additional embodiments $0.2 \leq w \leq 0.5$, $0.2 \leq u \leq 0.4$, $0 \leq y \leq 0.05$. A person of ordinary skill in the art will recognize that additional ranges of composition parameters within the explicit ranges above are contemplated and are within the present disclosure. As used herein, the notation (value1$\leq$variable$\leq$value2) implicitly assumes that value 1 and value 2 are approximate quantities. The engineering of the composition to obtain desired battery performance properties is described further in published U.S. patent application number 2011/0052981 to Lopez et al., entitled "Layer-Layer Lithium Rich Complex Metal Oxides With High Specific Capacity and Excellent Cycling," incorporated herein by reference.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

A co-precipitation process has been performed for the desired lithium rich metal oxide materials described herein having nickel, cobalt, manganese and additional optional metal cations in the composition and exhibiting the high specific capacity performance. In addition to the high specific capacity, the materials can exhibit a good tap density which leads to high overall capacity of the material in fixed volume applications. Specifically, lithium rich metal oxide compositions formed by the co-precipitation process were used in coated forms to generate the results in the Examples below.

Specifically, the synthesis methods based on co-precipitation have been adapted for the synthesis of compositions with the formula $Li_{1+b}Ni_\alpha Mn_\beta Co_\gamma A_\delta O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH \cdot H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in published U.S. patent application 2010/0086853A to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in published U.S. patent application 2010/0151332A to Lopez et al. entitled "Positive Electrode Materials for High Discharge Capacity Lithium Ion Batteries," incorporated herein by reference.

Also, it has been found that coating the positive electrode active materials can improve the cycling of lithium-based batteries. The coating can also be effective at reducing the irreversible capacity loss of the battery as well as increasing the specific capacity generally. The amount of coating material can be selected to accentuate the observed performance improvements. Suitable coating materials, which are generally believed to be electrochemically inert during battery cycling, can comprise metal fluorides, metal oxides, metal non-fluoride halides or metal phosphates. The results in the Examples below are obtained with materials coated with metal fluorides.

For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in published U.S. patent application number 2011/0111298 to Lopez et al, (the '298 application) entitled "Coated Positive Electrode Materials for Lithium Ion Batteries," incorporated herein by reference. Suitable metal oxide coatings are described further, for example, in published U.S. patent application number 2011/0076556 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in copending U.S. patent application Ser. No. 12/888,131 now U.S. Pat. No. 8,663,849 to Venkatachalam et al., entitled "Metal Halide Coatings on Lithium Ion Battery Positive Electrode Materials and Corresponding Batteries," incorporated herein by reference. In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure.

A metal fluoride coating can be deposited using a solution based precipitation approach. A soluble composition of the desired metal can be dissolved in a suitable solvent, such as an aqueous solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. After removing the coated electroactive material from the solution, the material can be dried and heated, generally above about 250° C., to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. The precursor coating can be heated, generally above about 250° C., to decompose the precursor to form the oxide coating.

Negative Electrode Active Materials

Desirable high capacity negative electrode active materials can comprise silicon oxide based materials, such as composites with nanostructured carbon materials or metal powders. In general, the silicon oxide materials have been found to have significantly improved performance if they are milled to a small particle size, whether or not formed into a composite. In particular, active silicon oxide based material can comprise oxygen deficient silicon oxide, i.e., that the material has a formula $SiO_x$ where $x<2$. The oxygen deficient silicon oxide can take up and release lithium with a large specific capacity and as described herein this material can be incorporated into lithium ion batteries with good cycling properties. Oxygen deficient silicon oxide can be unstable with respect to a disproportionation reaction to form elemental silicon and silicon dioxide, although this reaction does not seem to take place without the application of heat or with significant milling times. The processing to form desired forms of silicon oxide based materials can result in some formation of elemental silicon, which is electroactive, and silicon dioxide, which is believed to be inert in a lithium ion battery. The structure of the oxygen deficient silicon oxide has been debated, and evidence suggests the formation of amorphous domains of elemental silicon surrounded by amorphous domains of silicon dioxide, but the particular microscopic structure of the oxygen deficient silicon oxide material is not particularly relevant for the present discussion. In general, processing is performed under conditions in which only small amounts of crystalline silicon is observed in x-ray diffractograms, such that it is believed that a significant majority of the material remains as an active silicon oxide that is oxygen deficient relative to $SiO_2$. In general, it is desirable to mill the material to form smaller particles of the silicon oxide based material, and in some embodiments it may be desirable to form a composite with an electrically conductive component.

Suitable composites as described herein can comprise silicon oxide, carbon components, such as graphitic particles (Gr), inert metal powders (M), elemental silicon (Si), especially nanoparticles, pyrolytic carbon coatings (HC), carbon nano fibers (CNF), or combinations thereof. Thus, the general compositions of the composites can be represented as $\alpha SiO\text{-}\beta Gr\text{-}\chi HC\text{-}\delta M\text{-}\varepsilon CNF\text{-}\phi Si$, where $\alpha, \beta, \gamma, \delta, \varepsilon$, and $\phi$ are relative weights that can be selected such that $\alpha+\beta+\gamma+\delta+\varepsilon+\phi=1$. Generally $0.35<\alpha<1$, $0\leq\beta<0.6$, $0\leq\chi<0.65$, $0\leq\delta<0.65$, $0\leq\varepsilon<0.65$, and $0\leq\phi<0.65$. Certain subsets of these composite ranges are of particular interest. In some embodiments, composites with SiO and one or more carbon based components are desirable, which can be represented by a formula $\alpha SiO\text{-}\beta Gr\text{-}\chi HC\text{-}\varepsilon CNF$, where $0.35<\alpha<0.9$, $0\leq\beta<0.6$, $0\leq\chi<0.65$ and $0\leq\varepsilon<0.65$ ($\delta=0$ and $\phi=0$), in further embodiments $0.35<\alpha<0.8$, $0.1\leq\beta<0.6$, $0.0\leq\chi<0.55$ and $0\leq\varepsilon<0.55$, in some embodiments $0.35<\alpha<0.8$, $0\leq\beta<0.45$, $0.0\leq\chi<0.55$ and $0.1\leq\varepsilon<0.65$, and in additional embodiments $0.35<\alpha<0.8$, $0\leq\beta<0.55$, $0.1\leq\chi<0.65$ and $0\leq\varepsilon<0.55$. In additional or alternative embodiments, composites with SiO, inert metal powders and optionally one or more conductive carbon components can be formed that can be represented by the formula $\alpha SiO\text{-}\beta Gr\text{-}\chi HC\text{-}\delta M\text{-}\varepsilon CNF$, where $0.35<\alpha<1$, $0\leq\beta<0.55$, $0\leq\chi<0.55$, $0.1\leq\delta<0.65$, and $0\leq\varepsilon<0.55$. In further additional or alternative embodiments, composites of SiO with elemental silicon and optionally one or more conductive carbon components can be formed that can be represented by the formula $\alpha SiO\text{-}\beta Gr\text{-}\chi HC\text{-}\varepsilon CNF\text{-}\phi Si$, where $0.35<\alpha<1$, $0\leq\beta<0.55$, $0\leq\chi<0.55$, $0\leq\varepsilon<0.55$, and $0.1\leq\phi<0.65$ and in further embodiments $0.35<\alpha<1$, $0\leq\beta<0.45$, $0.1\leq\chi<0.55$, $0\leq\varepsilon<0.45$, and $0.1\leq\phi<0.55$. A person or ordinary skill in the art will recognize that additional ranges within the explicit ranges above are contemplated and are within the present disclosure.

Nanostructured materials can provide high surface areas and/or high void volume relative to a corresponding bulk material, such as a silicon oxide based material. By adapting to volume changes of the material, it is believed that nanostructured silicon oxide based material, e.g., nano particulates, can provide at least some accommodation for volume expansion and reduced stress on the material during silicon-lithium alloying. Furthermore, the adaptability of nano structured silicon oxide based materials can result in a corresponding decrease in irreversible structural changes in the material upon cycling such that the performance of the negative electrode degrades more slowly upon cycling, and a battery formed with the negative electrode can have satisfactory performance over a larger number of battery cycles. As described herein milling can be a suitable process for the formation of nanostructures silicon oxide based materials, and the milling process can be combined with the formation of a composite with a selected electrically conductive component.

Oxygen deficient silicon oxide with its high specific capacity with respect to intake and release of lithium and relatively lower volume change compared to silicon has been studied as negative electrode material. As used herein unless specifically noted otherwise, the term "silicon oxide" in reference to a lithium active material as well as "oxygen deficient silicon oxide" refers to amorphous oxygen deficient silicon oxides generally represented by formula $SiO_x$ where $0.1\leq x\leq 1.9$, in further embodiments $0.15\leq x\leq 1.8$, in other embodiments $0.2\leq x\leq 1.6$ and in additional embodiments $0.25\leq x\leq 1.5$. In some embodiments, the $x\approx 1$ and the silicon oxide is represented by formula SiO. A person of ordinary skill in the art will recognize that additional ranges of silicon oxide stoichiometry within the explicit ranges above are contemplated and are within the present disclosure. Silicon oxide based materials can contain various amounts of silicon, silicon oxide, and silicon dioxide. In general, silicon oxide measured or tested as control without prior treatment is referred to as the "pristine" sample throughout the specification. The word "pristine" used herein thus refers to untreated control sample instead of indicating the purity or condition of the control sample.

In some embodiments, the negative electrode active material comprises a composite of an initially particulate carbon material and a silicon oxide based material. After forming the composite, the silicon oxide based material can be nanostructured. For example, the components of the composite can be milled together to form the composite, in which the constituent materials are intimately associated, but generally not alloyed or otherwise chemically reacted. The nanostructure characteristics are generally expected to manifest themselves in the composite, although characterization of the composites may be less established relative to the characterization of the component materials. Specifically, the composite material may have dimensions, porosity or other high surface area characteristics that are manifestations of the nano-scale of the initial materials and/or properties of the material resulting from milling or other process used in forming the composite. In some embodiments, the negative electrode active material can comprise a silicon oxide based material in a composite with carbon nanofibers and/or carbon nanoparticles, which is achieved using high energy mechanical milling.

In some embodiments, the silicon-based negative electrode active material can comprise a silicon oxide-metal composite. Silicon oxide-metal composites can be formed from a variety of elemental metals and generally the elemental metals do not alloy with lithium during cycling of the corresponding battery. A wide range of metals can be used, as described further below.

Also, carbon coatings can be applied over the silicon oxide based materials to improve electrical conductivity, and the carbon coatings seem to also stabilize the silicon oxide based material with respect to improving cycling and decreasing irreversible capacity loss. In embodiments of particular interest, an organic composition dissolved in a suitable solvent can be mixed with the active composition and dried to coat the active composition with the carbon coating precursor. The precursor coated composition can then be pyrolyzed in an oxygen free atmosphere to convert the organic precursor into a carbon coating, such as a hard carbon coating. The carbon coated compositions have been found to improve the performance of the negative electrode active material.

Without being limited by a theory, it is believed that carbon coatings and/or composite formulations, especially in a nanostructured form, can provide structural stability to the expanding and contracting silicon oxide during silicon oxide-lithium intercalation/alloying and corresponding release of lithium. Desirable battery performance has been observed with nanostructured silicon oxide composites as well as with carbon coated silicon oxide based materials.

Based on the combination of improved parameters described herein, the silicon oxide based active materials can be introduced to form improved electrode structures. In particular, the selection of desirable electrically conductive components can provide for improved electrode design and the desirable polymer binders can provide desired mechanical properties suitable for the electrode design in view of significant active material changes during cycling. Based on these combined features, silicon oxide based electrodes can be formed with densities of active silicon oxide based materials, e.g., composite materials with electrically conductive components, with at least reasonable performance of at least about 0.6 g/cm$^3$, in further embodiments at least about 0.7 g/cm$^3$ and in further embodiments at least about 0.75 g/cm$^3$. Similarly, the silicon oxide based electrodes can have an average dried thickness of at least about 25 microns, in further embodiments at least about 30 microns and in additional embodiments at least about 50 microns, which can correspond to active material loadings of at least about 2 mg/cm$^2$. The resulting silicon oxide based electrodes can exhibit capacities per unit area of at least about 3.5 mAh/cm$^2$, in further embodiments at least about 4.5 mAh/cm$^2$ and in additional embodiments at least about 6 mAh/cm$^2$. A person of ordinary skill in the art will recognize that additional ranges of negative electrode parameters within the explicit ranges above are contemplated and are within the present disclosure.

Silicon Oxide

In general, any reasonable method can be used to synthesize the silicon oxide for use in the silicon oxide based materials described herein. At least SiO is available commercially from Sigma-Aldrich. Furthermore, silicon oxide may be produced, for example, by heating a mixture of silicon dioxide and metallic silicon to produce silicon monoxide gas and cooling the gas for precipitation as described for example in, U.S. Pat. No. 6,759,160 to Fukuoka et al. entitled "Silicon oxide powder and making method" and U.S. Patent Application No. 2007/0259113 to Kizaki et al. entitled "Silicon monoxide vapor deposition material, silicon powder for silicon monoxide raw material, and method for producing silicon monoxide", both are incorporated herein by reference. Alternatively, molten silicon can react with molecular oxygen to form silicon oxide material according to a process described in U.S. Pat. No. 6,759,160 to Iwamoto et al. entitled "Negative electrode active material and negative electrode using the same and lithium ion secondary battery" and U.S. Patent Application No. 2007/0099436 to Kogetsu et al. entitled "Method of producing silicon oxide, negative electrode active material for lithium ion secondary battery and lithium ion secondary battery using the same", both are incorporated herein by reference.

A silicon-silicon oxide (SiO$_x$) composite with 0<O/Si<1.0 was discussed in U.S. Patent Application No. 2010/0243951 to Watanabe et al. (herein after Watanabe '951 application) entitled "Negative electrode material for nonaqueous electrolyte secondary battery, making method and lithium ion secondary battery", incorporated herein by reference. The SiO has been prepared by etching silicon oxide particles in an acidic atmosphere. The SiO formed is then coated with carbon using CH$_4$ gas at elevated temperature. The composites in Watanabe '951 application showed improved IRCL, specific capacity, as well as cycling performance compared to samples formed without the acidic etching. A modified procedure where etching is conducted after carbon coating formation is described in U.S. Patent Application No. 2010/0288970 to Watanabe et al. (herein after Watanabe '970 application) entitled "Negative electrode material for non-aqueous electrolyte secondary battery, making method and lithium ion secondary battery", incorporated herein by reference. The composites in Watanabe '970 application showed improved IRCL and specific capacity and comparable cycling performance compared to samples formed without acidic etching. Earlier work utilized a vapor deposition process to produce SiO$_x$ in U.S. Patent Application No. 2007/0254102 to Fukuoka et al (herein after Fukuoka) entitled "Method for producing SiO$_x$ (x<1)", incorporated herein by reference. The Watanabe documents and the Fukuoka do not teach the specific composites described herein or the corresponding processes.

The formation of lithium silicates has been described in the context of materials for lithium ion batteries. For example, Silicon-Silicon oxide-lithium (Si—SiO—Li) composite has been discussed in U.S. Pat. No. 7,776,473 to Aramata et al. (herein after Aramata) entitled "Silicon-Silicon Oxide-Lithium composite, making method, and non-aqueous electrolyte secondary cell negative electrode material", incorporated herein by reference. In Aramata, silicon oxide is mixed with metallic lithium to undergo disproportionation into silicon and silicon dioxide doped with lithium and concomitant formation of Li$_4$SiO$_4$. The formation of lithium silicate correspondingly is believed to result in formation of a portion of elemental silicon, which can then act as an active material in a lithium based battery. The composite formed in Aramata has improved cycle performance and decreased IRCL compared to the silicon oxide material without lithium while the specific capacity however has decreased significantly. The use of supplemental lithium with silicon oxide based materials is not believed to result in substantial formation of lithium silicate. During electrochemical lithiation, the lithium intercalates and de-intercalates into and out from the amorphous silicon oxide structure in contrast with the formation of the stable crystalline lithium silicate structure. However, the formation of some lithium silicate as a byproduct of the lithiation process herein has not been ruled out, although even with the formation of such byproducts, the lithiation processes described herein are substantially different from the processes and compositions described in Aramata.

An early description of oxygen deficient silicon oxide as an active material for a lithium ion battery is described in U.S. Pat. No. 6,083,644 to Watanabe et al. entitled "Non-aqueous electrolyte secondary battery," incorporated herein by reference. Synthesis of silicon oxide with various amount of carbon coating were discussed in U.S. Patent Application No. 2004/0033419 to Funabiki et al. (herein after Funabiki) entitled "Negative active material, negative electrode using the same, non-aqueous electrolyte battery using the same, and method for preparing the same", incorporated herein by reference. In Funabiki, silicon oxide was heat treated to form a composite SiO$_x$ followed by itching with hydrofluoric acid to remove any SiO$_2$ in the product material.

Composites of Silicon oxide-graphite (SiO—C) with optional carbon coating were discussed in U.S. Pat. No. 6,638,662 to Kaneda et al. (herein after Kaneda) entitled "Lithium secondary battery having oxide particles embedded in particles of carbonaceous material as a negative electrode material", incorporated herein by reference. In Kaneda, silicon oxide is ball milled extensively with graphite, which is in turn optionally coated with carbon through the heating of the silicon oxide with a carbon precursor in an inert atmosphere.

Lim et al. discussed the use of silicon, silicon oxide, or silicon alloy with carbon in U.S. Patent Application No. 2009/0325061 entitled "Secondary battery", incorporated herein by reference. Jeong et al. discussed the use of silicon based compound alloyed with metal mixed with a carbonaceous material in U.S. Pat. Nos. 7,432,015 and 7,517,614, both entitled "Negative active material for a rechargeable lithium battery, a method of preparing the same, and a rechargeable lithium battery comprising the same", both incorporated herein by reference. The silicon oxide used is formed by heating silicon dioxide with silicon at elevated temperature. Similarly, Lee et al. discussed the use of silicon based compound alloyed with metal mixed with a carbonaceous material in U.S. Patent Application No. 2005/0233213, entitled "Negative active material for a rechargeable lithium battery, a method of preparing the same, and a rechargeable lithium battery comprising the same", incorporated herein by reference. The silicon oxide used is formed by heating silicon dioxide with silicon at elevated temperature. Mah et al. disclosed synthesis of $SiO_x$ (0<x<0.8) from silane compound in U.S. Patent Application No. 2008/0193831 entitled "Anode active material, method of preparing the same, anode and lithium battery containing the material", incorporated herein by reference. Kim et al. disclosed synthesis of $SiO_x$ (0<x<2) by sintering hydrogen silsesquioxane in U.S. Pat. No. 7,833,662 entitled "Anode active material, method of preparing the same, and anode and lithium battery containing the material", incorporated herein by reference.

Composites with Carbon Particles and/or Nano-Scale Carbon Fibers

Carbon nanofibers and/or carbon nanoparticles provide for good electrical conductivity and can provide a support structure for nano-structured silicon oxide such that the stress of alloy formation with lithium can be reduced. Carbon nanofibers can be obtained or can be synthesized using a vapor organic composition and a catalyst in a suitable thermal reaction. One approach for the synthesis of carbon nanofibers are described in published U.S. patent application 2009/0053608 to Choi et al., entitled "Anode Active Material Hybridizing Carbon Nanofiber for Lithium Secondary Battery," incorporated herein by reference. Carbon fibers are available commercially from a variety of suppliers. Suitable suppliers are summarized in Table 3, which has parts A and B.

TABLE 3A

| Fiber | Company | Product ID | Length (μm) | Diameter (nm) |
|---|---|---|---|---|
| 1 | Showa Denko | VGCF-H | 10-20 | 150 |
| 2 | Nano-vision tech | GNF-100 | ~30 | ~200 |
| 3 | | GNF-L | ~30 | ~300 |
| 4 | Nanostructured & amorphous materials Inc. | GNF | 10-40 | 200-500 OD & 1-10 core |
| 5 | Cytek carbon Inc | Cytek | 10 | |
| 6 | Pyrograph products Inc. | PR19-XT-HHT | | 150 |
| 7 | | PR25-XT-HHT | | 100 |

In general, suitable carbon nanofibers can have average diameters of about 25 nm to about 250 nm and in further embodiments, from about 30 nm to about 200 nm, and with average lengths from about 2 microns to about 50 microns, and in further embodiments from about 4 microns to about 35 microns. A person of ordinary skill in the art will recognize that additional ranges of nanofiber average diameters and lengths within the explicit ranges above are contemplated and are within the present disclosure.

Similarly, pyrolytic carbon particles, e.g., carbon blacks, can be used as a support in appropriate composites. Carbon black can have average particle sizes of no more than about 250 nm, and in some embodiments no more than about 100 nm, as well as suitable subranges within these ranges. Carbon blacks are readily available from a variety of suppliers, such as Cabot Corporation and Timcal, Ltd, Switzerland (acetylene black, Super P™).

Graphite (Gr), a polymorph of the element carbon, is a semimetal and electrically conductive. Graphite is also called graphitic carbon or graphitic particles and can be crystalline with isolated, flat, plate-like particles. Graphite can be milled with silicon oxide with or without additional material to form composites having improved capacity. In some embodiments, the composites may contain 0 to 60% wt, 5 to 55% wt, or 10 to 45% wt graphitic carbon. A person or ordinary skill in the art will recognize that additional ranges within the explicit ranges above are contemplated and are within the present disclosure. Graphite powders are readily available from a variety of suppliers, such as natural graphite from Superior Graphite, MAGD™ and MAGE™ artificial graphite from Hitachi Chemical, MPG13™ from Mitsubishi, and MCMB™ graphite from Nippon Carbon.

It can be desirable to form composites of nano-scale carbon particles and/or fibers with silicon oxide. To form the composites, the constituent materials are obtained and/or prepared and combined to introduce strong mechanical interactions between the material components. While not wanted to be limited by theory, the composite may comprise, for example, at least a fraction of the carbon composition coated onto silicon oxide that is milled to a submicron scale from the processing. In general, the types of interactions between the constituents of the composites do not need to be well characterized. Nevertheless, the composites are distinct in composition and properties from simple blends of the constituent materials that may be held together with a binder. The composites though are found to exhibit desirable battery performance in a lithium ion battery. In general, the composite can comprise at least about 5 weight percent silicon oxide, in further embodiments, from about 7.5 weight percent to about 95 weight percent and in additional embodiments from about 10 weight percent to about 90 weight percent silicon oxide. A person of ordinary skill in the art will recognize that additional ranges of silicon oxide com-

TABLE 3B

| Fiber | Powder resistivity (W-cm) | Specific surface area (m²/g) | Bulk density (g/cm³) | True density (g/cm³) | Purity |
|---|---|---|---|---|---|
| 1 | 0.01-0.015 at 0.8 g/cm³ | 13 | 0.04 | 2 | 0.1% ash |
| 2 | | 100-300 | 0.15-0.18 | | >90% |
| 3 | | 100 | 0.12-0.15 | | >90% |
| 4 | ~0.06 at 0.8 g/cm³ | <25 | 0.15-0.25 | 1.9 | ~99.8% & 0.2% Fe |
| 5 | 0.012 | | | 1.9 | |
| 6 | | 15-25 | | | Fe <100 ppm |
| 7 | | ~40 | | | Fe <100 ppm | position within the explicit ranges above are contemplated and are within the present disclosure.

In some embodiments, silicon oxide composites can be formed by milling silicon oxide with carbon fibers and/or carbon nanoparticles. The milling process can comprise, for example, jar milling and/or ball milling, such as planetary ball milling. Ball milling and similarly jar milling may involve grinding using a grinding medium, such as ceramic particles, which can then be substantially removed from the ground material. A planetary ball mill is a type of ball milling in which the mill comprises a sun-wheel, at least one grinding jar mounted eccentrically on the sun-wheel, and a plurality of mixing balls within the grinding jar. In operation, the grinding jar rotates about its own axis and in the opposite direction around the common axis of the sun-wheel.

Desirable ball milling rotation rates and ball milling times can be selected based on the desired silicon oxide composite composition and structure. For the formation of silicon oxide composites described herein, suitable ball milling rotation rates generally can be from about 25 rpm to about 1000 rpm and in further embodiments from about 50 rpm to about 800 rpm. Furthermore, desirable ball milling times can be from about 10 minutes to about 20 hour, in further embodiments from about 20 minutes to about 15 hours, in additional embodiments from about 1 hour to 5 hours. A person of ordinary skill in the art will recognize that additional ranges of milling rates and times within the explicit ranges above are contemplated and are within the present disclosure. The mill container can be filled with an inert gas to avoid oxidizing the contents of the container during milling. Examples of suitable grinding media include, for example, particles of zirconia, alumina, tungsten carbide or the like.

The milling of the silicon oxide based materials results in a reduced particle size that seems to contribute significantly to performance based on the milling of the particles. The desirable performance can be achieved similarly with the performance of the milling with electrically conductive particles for the formation of a composite. In general, the milled particles can be evaluated with respect to size by forming a dispersion and using light scattering to measure particle size. Direct measurements by dynamic light scattering (DLS) are intensity weighted particle size distributions, and these can be converted to volume based distributions using conventional techniques. The volume-average particle size can be evaluated from the volume-based particle size distribution. Suitable particle size analyzers include, for example, a Microtrac UPA instrument from Honeywell and Saturn DigiSizer™ from Micromeritics based on dynamic light scattering, a Horiba Particle Size Analyzer from Horiba, Japan and ZetaSizer Series of instruments from Malvern based on Photon Correlation Spectroscopy. The principles of dynamic light scattering for particle size measurements in liquids are well established. The volume average particle sizes can be no more than about 10 microns, in other embodiments no more than about 8 microns and in further embodiments no more than about 7 microns. A person of ordinary skill in the art will recognize that additional ranges of average particle size within the explicit ranges above are contemplated and are within the present disclosure.

Metal Particle—Silicon Oxide Composites

Inert metal particles are also useful for the formation of composites with the silicon oxide materials. The incorporation of the metal into the composite can improve the electrical conductivity of the composite material. The metal for these composites is generally selected to be inert with respect to reaction both with silicon oxide so that the metal does not reduce the silicon oxide and with lithium so that the metal does not alloy with lithium under conditions to be experienced in the batteries. The composites are formed through high energy milling or the like to intimately combine the materials in the composite so that the materials are distinctly different from simple blend of the material that may be held together by a polymer. In the composite materials, while not wanting to be limited by theory, the more malleable metal may be spread over the silicon oxide material during the formation of the composite.

The inert metal-silicon oxide composites are found to exhibit desirable battery performance in a lithium ion battery. Suitable metals include, for example, nickel, iron, vanadium, cobalt, titanium, zirconium, silver, manganese, molybdenum, gallium, chromium and combinations thereof. In general, the composite can comprise at least about 5 weight percent silicon oxide, in further embodiments, from about 7.5 weight percent to about 95 weight percent and in additional embodiments from about 10 weight percent to about 90 weight percent silicon oxide. Similarly, in some embodiments, the composite can comprise from about 5 to about 45 weight percent inert metal and in further embodiments from about 7 to about 40 weight percent inert metal. A person of ordinary skill in the art will recognize that additional ranges of silicon oxide composition within the explicit ranges above are contemplated and are within the present disclosure.

The inert-metal-silicon oxide composites can be formed using high energy mechanical milling similar to the formation of the carbon-silicon oxide composites. A ball media generally is used with the metal particles to facilitate the milling process. Desirable milling rotation rates and milling times can be selected based on the desired inert metal-silicon oxide composite composition and structure. For the formation of silicon oxide composites described herein, suitable milling rotation rates generally can be from about 25 rpm to about 1000 rpm and in further embodiments from about 50 rpm to about 800 rpm. Furthermore, desirable milling times can be from about 10 minutes to about 50 hour and in further embodiments from about 20 minutes to about 20 hours. A person of ordinary skill in the art will recognize that additional ranges of milling rates and times within the explicit ranges above are contemplated and are within the present disclosure. The mill container can be filled with an inert gas to avoid oxidizing the contents of the container during milling.

Pyrolytic Carbon Coatings

Carbon coatings can be applied to silicon oxide based material to increase electrical conductivity and/or to provide structural support to the resulting materials. In general, the carbon coatings can be applied to silicon oxide, for example, after milling the silicon oxide, silicon oxide carbon particle composites, silicon oxide-metal particle composites or the like. The carbon coatings can be formed from pyrolyzed organic compositions under oxygen free atmospheres. Hard carbon coatings are generally formed at relatively high temperatures. The properties of the coatings can be controlled based on the processing conditions. In particular, carbon coatings can have a high hardness and generally can comprise significant amorphous regions possible along with graphitic domains and diamond structured domains.

Carbon coatings formed from coal tar pitch is described in published PCT patent application WO 2005/011030 to Lee et al., entitled "A Negative Active Material for Lithium Secondary Battery and a Method for Preparing Same,"

incorporated herein by reference. In contrast, as described herein, an organic composition is dissolved in a suitable solvent and mixed with the active material. The solvent is removed through drying to form a solid precursor coated active material. This approach with a solvent for delivering a solid pyrolytic carbon precursor can facilitate formation of a more homogenous and uniform carbon coating. Then, the precursor coated material is heated in an effectively oxygen free environment to form the pyrolytic carbon coating.

The heating is generally performed at a temperature of at least about 500° C., and in further embodiments at least about 700° C. and in other embodiments, from about 750° C. to about 1350° C. Generally, if temperatures are used above about 800° C., a hard carbon coating is formed. The heating can be continued for a sufficient period of time to complete the formation of the carbon coating. In some embodiments, it is desirable to use pyrolytic carbon precursors that can be delivered in a solvent to provide for good mixing of the precursors with the silicon oxide based materials and to provide for a range of desired precursor compounds. For example, desirable precursors can comprise organic compositions that are solids or liquids at room temperature and have from two carbon atoms to 40 carbon atoms, and in further embodiments from 3 carbon atoms to 25 carbon atoms as well as other ranges of carbon atoms within these ranges, and generally these molecules can comprise other atoms, such as oxygen, nitrogen, sulfur, and other reasonable elements. Specifically, suitable compounds include, for example, sugars, other solid alcohols, such as furfuryl alcohol, solid carboxylic acids, such as citric acid, polymers, such as polyacrylonitrile, and the like. The coated materials generally comprise no more than about 50 weight percent pyrolytic carbon, in further embodiments no more than about 40 weight percent, and in additional embodiments, from about 1 weight percent to about 30 weight percent. A person of ordinary skill in the art will recognize that additional ranges within the explicit ranges above of amounts of coating composition are contemplated and are within the present disclosure.

Metal Coatings

As an alternative or in addition to carbon coatings, elemental metal can be coated onto the silicon oxide based material. For example, the metal coatings can be applied to silicon-oxide carbon composites, silicon oxide-metal particle composites or the like. Suitable elemental metals include metals that can be reduced under reasonable conditions to form an inert metal in the battery. In particular, silver and copper can be reduced to deposit the metal coating. The elemental metal coating can be expected to increase electrical conductivity and to stabilize the silicon oxide based material during the lithium alloying and de-alloying process. In general, the coated material can comprise no more than about 25 weight percent metal coating and in further embodiments from about 1 weight percent to about 20 weight percent metal coating. A person of ordinary skill in the art will recognize that additional ranges of metal coating composition within the explicit ranges above are contemplated and are within the present disclosure. A solution based approach can be used to apply the metal coating. For example, the silicon oxide based material to be coated can be mixed with a solution comprising dissolved salt of the metal, such as silver nitrate, silver chloride, copper nitrate, copper chloride or the like, and a reducing agent can be added to deposit the metal coating. Suitable reducing agents include, for example, sodium hypophosphite, sodium borohydride, hydrazine, formaldehyde and the like.

Supplemental Lithium

Various approaches can be used for the introduction of supplemental lithium into the battery, although following corresponding initial reactions and/or charging, the negative electrode becomes associated with excess lithium for cycling from the supplemental lithium. With respect to the negative electrode in batteries having supplemental lithium, the structure and/or composition of the negative electrode can change relative to its initial structure and composition following the first cycle as well as following additional cycling. Depending on the approach for the introduction of the supplemental lithium, the positive electrode may initially include a source of supplemental lithium and/or a sacrificial electrode can be introduced comprising supplemental lithium. The supplemental lithium is introduced into the negative electrode using electrochemical methods in contrast with purely chemical or mechanical methods. Chemical methods or mechanical methods, such as milling, may lead to effectively irreversible formation of lithium silicate, while the electrochemical method does not seem to result in lithium silicate formation. In particular, the electrochemical introduction of lithium in general results in reversible lithium incorporation, although lithium can be consumed in an initial formation of a solvent electrolyte interphase (SEI) layer. With respect to initial structure of the negative electrode, in some embodiments, the negative electrode has no changes due to the supplemental lithium. In particular, if the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of an external voltage since oxidation of the elemental lithium drives the reaction. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage, such as 4.5V.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. After the negative electrode is in contact with electrolyte, a reaction can take place, and the supplemental lithium is transferred to the negative electrode active material. During this process, the solid electrolyte interface (SEI) layer is also formed. Thus, the supplemental lithium is loaded into the negative electrode active material with at least a portion consumed in formation of the SEI layer. The excess lithium released from the lithium rich positive electrode active material is also deposited into the negative electrode active material during eventual charging of the battery. The supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material embedded on the surface of the active layer. In an alternative configuration, a supplemental lithium source layer is between the active layer and current collector. Also, in some embodiments, the negative electrode can comprise supplemental lithium source layers on both surfaces of the active layer.

In additional embodiments, at least a portion of the supplemental lithium can be supplied to the negative electrode active material prior to assembly of the battery. In other words, the negative electrode can comprise partially lithium-loaded silicon oxide based active material, in which the partially loaded active material has a selected degree of loading of lithium through intercalation/alloying or the like. For example, for the preloading of the negative electrode active material, the negative electrode active material can be contacted with electrolyte and a lithium source, such as elemental lithium, lithium alloy or other sacrificial lithium source that is more electronegative than the negative electrode active material.

An arrangement to perform such a preloading of lithium can comprise an electrode with silicon oxide based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon oxide based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, the lithium source within an electrode can be assembled into a cell with the electrode to be preloaded with lithium. A separator can be placed between the respective electrodes. Current can be allowed to flow between the electrodes. Depending on the composition of the lithium source it may or may not be necessary to apply a voltage to drive the lithium deposition within the silicon oxide based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, an SEI layer can be formed with a desired degree of control during the preloading with lithium of the negative electrode active material. Then, the negative electrode is fully formed during the preparation of the negative electrode with a selected preloading with lithium.

In general, the lithium source can comprise, for example, elemental lithium, a lithium alloy or a lithium composition, such as a lithium metal oxide, that can release lithium from the composition. Elemental lithium can be in the form of a thin film, such as formed by evaporation, sputtering or ablation, a lithium or lithium alloy foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. Lithium alloys include, for example, lithium silicon alloys and the like. Lithium composition with intercalated lithium can be used in some embodiments, and suitable compositions include, for example, lithium titanium oxide, lithium tin oxide, lithium cobalt oxide, lithium manganese oxide, and the like.

In general, for embodiments in which supplemental lithium is used, the amount of supplemental lithium preloaded or available to load into the active composition can be in an amount of at least about 2.5% of capacity, in further embodiments from about 3 percent to about 90 percent of capacity, in additional embodiments from about 5 percent to about 80 percent of capacity, and in some embodiments at least 10% of the negative electrode active material capacity. The supplemental lithium can be selected to approximately balance the IRCL of the negative electrode, although other amounts of supplemental lithium can be used as desired. Thus, the contribution to the IRCL of the negative electrode can be effectively reduced or removed due to the addition of the supplemental lithium such that the measured IRCL of the battery represents partially or mostly contributions from the IRCL of the positive electrode, which is not diminished due to the presence of supplemental lithium. In some embodiments, the IRCL can be reduced to no more than about 20% of the initial negative electrode capacity, in further embodiments no more than about 15%, in additional embodiments no more than about 10%. A person of ordinary skill in the art will recognize that additional ranges of IRCL within the explicit ranges above are contemplated and are within the present disclosure.

Another parameter of interest relates to the total balance of the capacity of the negative electrode active material against the positive electrode theoretical capacity, when supplemental lithium is present. It has been observed that the inclusion of additional negative electrode capacity can be desirable when supplemental lithium is present to compensate for all or some of the IRCL of the negative electrode. In some embodiments, the balance expressed as a ratio of negative electrode capacity divided by positive electrode capacity expressed as a percent can be from about 95 to about 180 percent of the negative electrode capacity, in further embodiments from about 100 to about 160 percent and in other embodiments, from about 110 percent to about 150 percent. Furthermore, increased values of average voltage are observed when the battery comprises supplemental lithium. Specifically, for batteries with SiO based active materials a supplemental lithium, the average voltage can be at least about 3.3V, in further embodiments at least above 3.35V and in other embodiments from 3.37V to about 3.45V when cycled between 4.5V and 2.0V at rates of C/3. A person of ordinary skill in the art will recognize that additional ranges of battery balance within the explicit ranges above are contemplated and are within the present disclosure.

Battery Performance

Batteries formed from lithium rich positive electrode active materials, silicon oxide based negative electrode active materials, with or without supplemental lithium have demonstrated promising performance under realistic discharge conditions. Specifically, the silicon oxide based negative electrode active materials have demonstrated a high specific capacity upon cycling of the batteries at moderate discharge rates and with realistic cathodes with cycling over a voltage range with a high voltage cutoff. In particular, desirable specific capacities can be obtained based on both the masses of the positive electrode active material and the negative electrode active material such that the results correspond with a high overall capacity of the batteries. Silicon based negative electrode composites described herein can exhibit reasonable irreversible capacity losses, and in some embodiments supplemental lithium can be successfully used to reduce the irreversible capacity loss. Electrode balance to reduce irreversible capacity loss is described above. Relatively stable cycling of the silicon based negative electrode material at high specific capacities can be obtained for a modest number of cycles against a positive electrode with lithium rich high capacity lithium metal oxides.

In general, various similar testing procedures can be used to evaluate the capacity performance of the battery. The silicon oxide based electrodes can be tested against a lithium foil electrode to evaluate the capacity and the IRCL. However, more meaningful testing can be performed with a realistic positive electrode since then the battery is cycled over appropriate voltage ranges for cycling in a useful battery. Suitable testing procedures are described in more detail in the examples below. Specifically, batteries assembled with a lithium foil electrode are cycled with the silicon oxide based electrode functioning as a positive electrode (cathode) and the lithium foil functions as the negative electrode (anode). The batteries with a lithium foil electrode can be cycled over a voltage range, for example, from 0.005V to 1.5 V at room temperature. Alternatively, batteries can be formed with a positive electrode comprising a layered-layered lithium rich metal oxide in which the silicon oxide based electrode is then the negative electrode, and the battery can then be cycled between 4.5 volts and 1.0 volt at room temperature. For the batteries with a lithium metal oxide-based positive electrode, the first cycle can be charged and discharged at a rate of C/20 and subsequent cycling can be at a rate of C/3 unless specified otherwise with charging at C/3. The specific discharge capacity is very dependent on the discharge rate. The notation C/x implies that the battery is discharged at a rate to fully discharge the battery to the selected voltage minimum in x hours.

The specific capacity of the silicon oxide based negative electrode can be evaluated in configurations with either a lithium-foil counter-electrode or with a lithium metal oxide based counter electrode. For the batteries formed with a lithium metal oxide based positive electrode, the specific capacity of the battery can be evaluated against the weights of both anode active material and cathode active material, which involved division of the capacity by the respective weights. If supplemental lithium is included in the battery, the weight of the negative electrode active material includes the weight of the supplemental lithium. Using a high capacity positive electrode active material, the overall benefits of using a high capacity silicon oxide based negative electrode active material becomes even more beneficial. Based on the capacity of the battery, the specific capacities can be obtained by dividing the respective weight of the active materials in each electrode. It can be desirable to have high specific capacities for both electrodes. The advantages of high specific capacity for each electrode with respect to the overall specific capacity of the battery is described in an article by Yoshio et al., Journal of Power Sources 146 (June 2005) pp 10-14, incorporated herein by reference.

In general, it can be desirable for the negative electrode to have a specific capacity at the tenth cycle of at least about 500 mAh/g, in further embodiments at least about 700 mAh/g, in some embodiments at least about 850 mAh/g, in additional embodiments at least about 1000 mAh/g, and in some embodiments at least about 1100 mAh/g at a discharge rate of C/3 when cycled between 4.5V and 1.0V based on the anode active weight. Depending on the specific silicon oxide based active material, the lower voltage cutoff can be selected to be 2.0V, 1.5V, 1.0V or 0.5V. In general, the lower voltage cutoff can be selected to extract a selected portion of the electrode capacity from about 92% to about 99%, and in further embodiments from about 95% to about 98% of the total capacity of the positive electrode. As noted above, it can be desirable to have a relatively high specific capacity for both electrodes when the positive electrode comprises a lithium rich metal oxide, and the battery can exhibit at a discharge rate of C/3 at the 50th cycle a positive electrode specific capacity of at least about 150 mAh/g and a negative electrode specific capacity of at least about 750 mAh/g, in further embodiments a positive electrode specific capacity of at least about 160 mAh/g and a negative electrode specific capacity of at least about 800 mAh/g, and in additional embodiments a positive electrode specific capacity of at least about 170 mAh/g and a negative electrode specific capacity of at least about 1000 mAh/g, when cycled between 4.5V and 1.0V. The batteries with lithium rich metal oxides and silicon oxide based materials can exhibit desirable cycling properties, and in particular the batteries can exhibit a discharge capacity decrease of no more than about 15 percent at the 50th discharge cycle relative to the 7th discharge cycle and in further embodiments no more than about 10 percent when discharged at a rate of C/3 from the 7th cycle to the 50th cycle. A person of ordinary skill in the art will recognize that additional ranges of specific capacity and other battery parameters within the explicit ranges above are contemplated and are within the present disclosure. In some embodiments, the batteries further include supplemental lithium to reduce the irreversible capacity loss and to stabilize the cycling of lithium rich metal oxides.

EXAMPLES

A significant variety of silicon oxide based active negative electrode materials were tested in batteries to evaluate their performance. Many of these samples comprised silicon oxide and some of these samples were formed into composites with carbon and/or metal powders. Generally, the samples were formed into coin cells to test the performance of materials with respect to lithium alloying/intercalation. Coin cells were formed either with lithium foil as the counter electrode such that the silicon oxide based electrode functioned as a positive electrode against the lithium foil or with a positive electrode comprising a lithium rich mixed metal oxide such that the resulting battery had a realistic formulation for cycling over a relevant voltage range for a commercial battery. The general procedure for formation of the coin cells is described in the following discussion and the individual examples below describe formulation of the silicon oxide based materials and the performance results from batteries formed from the silicon oxide materials. The batteries described herein in general were cycled by charging and discharging between 4.6V and 1.0V in the first formation cycle and between 4.5V and 1.0V in the cycle testing for batteries with HCMR™ positive electrode or between 0.005V-1.5V for batteries with lithium foil counter electrode at a rate of C/20, C/10, C/5, and C/3 for the 1st and 2nd cycles, for the 3rd and 4th cycles, for the 5th and 6th cycles, and for subsequent cycles, respectively.

To test particular samples, electrodes were formed from the samples of silicon oxide based active materials. In general, a powder of silicon oxide based active material was mixed thoroughly with acetylene black (Super P® from Timcal, Ltd., Switzerland) to form a homogeneous powder mixture. Separately, polyimide binder was mixed with N-methyl-pyrrolidone ("NMP") (Sigma-Aldrich) and stirred overnight to form a polyimide-NMP solution. The homogenous powder mixture was then added to the polyimide-NMP solution and mixed for about 2 hours to form a homogeneous slurry. The slurry was applied onto a copper foil current collector to form a thin, wet film and the laminated current collector was dried in a vacuum oven to remove NMP and to cure the polymer. The laminated current collector was then pressed between rollers of a sheet mill to obtain a desired lamination thickness. The dried laminate contained at least 75 wt % silicon oxide based active material and at least 2 wt % polyimide binder. The resulting electrodes were assembled with either a lithium foil counter electrode or with a counter electrode comprising a lithium metal oxide (LMO).

For a first set of batteries with the lithium foil counter electrodes, the silicon oxide based electrodes were placed inside an argon filled glove box for the fabrication of the coin cell batteries. Lithium foil (FMC Lithium) having thickness of roughly 125 micron was used as a negative electrode. A conventional electrolyte comprising carbonate solvents, such as ethylene carbonate, diethyl carbonate and/or dimethyl carbonate, was used. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

For a second set of batteries, the silicon oxide based electrodes were used as negative electrode, and the positive electrodes comprised a high capacity lithium rich composition. The resulting positive electrodes are referred to as high capacity manganese rich ("HCMR™") electrodes. LMO composite active materials were synthesized using a selected co-precipitation process. The synthesis of similar compositions by a hydroxide co-precipitation process have been described in published U.S. patent application 2010/0086853A to Venkatachalam et al. entitled "Positive Electrode Material for Lithium Ion Batteries Having a High Specific Discharge Capacity and Processes for the Synthesis of these Materials", and the synthesis of similar compositions by a carbonate co-precipitation process have been described in published U.S. patent application 2010/0151332A to Lopez et al. entitled "Positive Electrode Materials for High Discharge Capacity Lithium Ion Batteries", both of which are incorporated herein by reference. In particular, the LMO powder was synthesized that is approximately described by the formula $xLi_2MnO_3 \cdot (1-x)LiNi_uMn_vCo_wO_2$ where $x=0.5$. A discussion of the design of HCMR™ compositions to achieve particular performance results are described in detail in published U.S. patent application number 2011/0052981 filed Aug. 27, 2010 to Lopez et al., entitled "Layer-Layer Lithium Rich Complex Metal Oxides With High Specific Capacity and Excellent Cycling," incorporated herein by reference.

Electrodes were formed from the synthesized HCMR™ powder by initially mixing it thoroughly with conducting carbon black (Super P~ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried electrode comprised at least about 75 weight percent active metal oxide, at least about 1 weight percent graphite, and at least about 2 weight percent polymer binder.

Some of the batteries fabricated from a silicon oxide based negative electrode and a HCMR™ positive electrode further comprised supplemental lithium. In particular, a desired amount of SLMP® powder (FMC Corp., stabilized lithium metal powder) was loaded into a vial and the vial was then capped with a mesh comprising nylon or stainless steel with a mesh size between about 40 μm to about 80 μm. SLMP® (FMC corp.) was then deposited by shaking and/or tapping the loaded vial over a formed silicon oxide based negative electrode. The coated silicon oxide based negative electrode was then compressed to ensure mechanical stability.

Batteries fabricated from a silicon oxide based negative electrode and a HCMR™ positive electrode were balanced to have excess negative electrode material. Specific values of the negative electrode balance are provided in the specific examples below. For batteries containing supplemental lithium, balancing was based on the ratio of the first cycle lithium insertion capacity of the silicon oxide based negative electrode to the theoretical capacity of the HCMR™ positive electrode. The amount of supplemental lithium was selected to approximately compensate for the irreversible capacity loss of the negative electrode. For batteries without supplemental lithium, balancing was calculated as the first cycle lithium insertion capacity of the silicon oxide based negative electrode to the theoretical capacity of the HCMR™ positive electrode as well. In particular, for a given silicon oxide based active composition, the insertion and extraction capacities of the silicon oxide based composition can be evaluated with the battery having a positive electrode comprising the silicon oxide based active material and a lithium foil negative electrode where lithium is intercalated/alloyed to the silicon oxide based electrode to 5 mV and de-intercalated/de-alloyed to 1.5V at a rate of C/20.

Coin cell batteries were formed by placing the silicon oxide based electrode and the HCMR™ electrode inside an argon filled glove box. An electrolyte was selected to be stable at high voltages, and appropriate electrolytes are described in copending U.S. patent application Ser. No. 12/630,992 now U.S. Pat. No. 8,993,177 to Amiruddin et al., entitled "Lithium Ion Battery With High Voltage Electrolytes and Additives," incorporated herein by reference. Based on these electrodes and the high voltage electrolyte, the coin cell batteries were completed with separator and hardware as described above for the batteries with the lithium foil electrode. During the first cycle, the batteries were charged to 4.6V, and in subsequent cycles, the batteries were charged to 4.5V.

Example 1: Silicon Oxide Based Anode Material

This example studies the effect of high energy mechanical milling (HEMM) and heat treatment on the silicon oxide based electrode active material. The silicon oxide starting materials used herein are 325 mesh particles from Sigma-Aldrich. In general, HEMM was used to reduce particle size of the starting SiO materials. HEMM process was found to not only reduce the size of SiO but also partially crystallize amorphous SiO to form a material comprising some crystalline Si. High temperature heat treatment of silicon oxide based anode active material has also been shown to partially crystallize amorphous SiO to form some crystalline Si as well as carbonize a carbon precursor coating material to pyrolytic carbon concomitantly. HEMM has been used in the subsequent examples below to form composites of silicon oxide powder (325 mesh) with conductive material such as graphite, hard carbon, carbon nano-fiber, and metal to increase the performance and the loading level of silicon oxide based electrode active materials.

Figure 2:
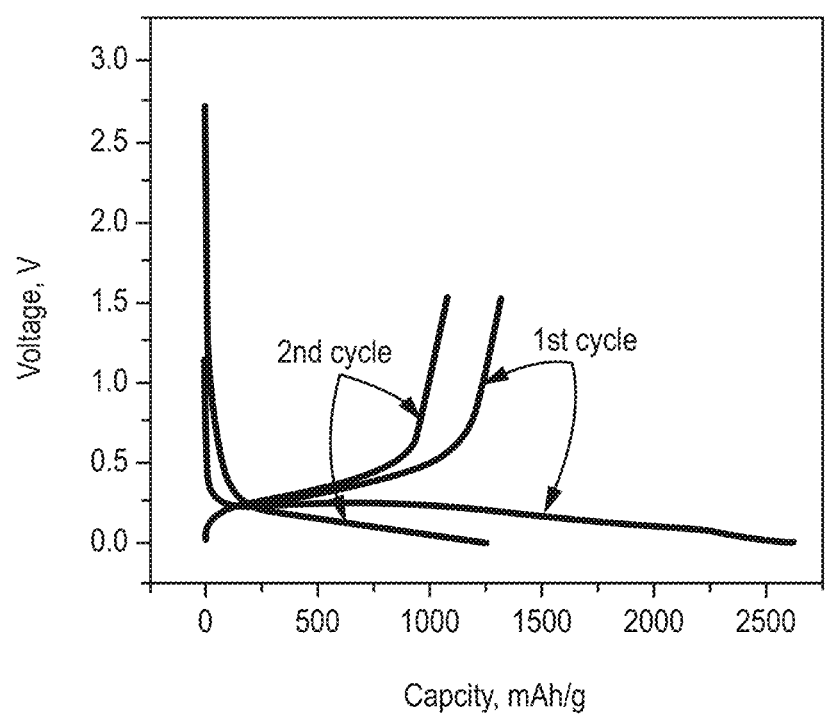
FIG. 2 is a plot of charge/discharge profiles of pristine SiO in micron size.
Figure 3:
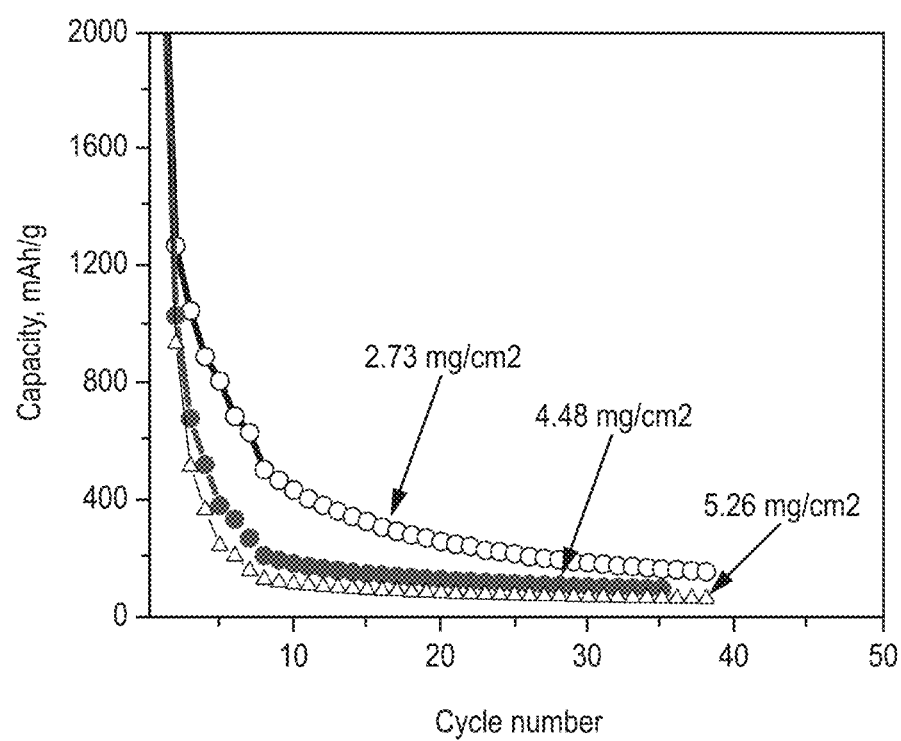
FIG. 3 shows cycling performance of pristine SiO in micron size at different loading density.

Micron size silicon oxide (325 mesh) was incorporated into coin cells with a lithium foil electrode to evaluate its capacity and cycling behavior. FIG. 2 is plots of the $1^{st}$ and $2^{nd}$ cycle charge and discharge profile of micron size silicon oxide without milling, showing large irreversible capacity loss (IRCL). Electrode with micron size silicon oxide at different loading densities 2.73 mg/cm$^2$, 4.48 mg/cm$^2$, and 5.26 mg/cm$^2$ were cycled and the results are shown in FIG. 3. Batteries incorporating electrodes with silicon oxide loading density of 2.73 mg/cm$^2$ were observed to have better specific capacity than batteries having electrodes with silicon oxide loading densities of 4.48 mg/cm$^2$ and 5.26 mg/cm$^2$. Although significant capacity loss and generally poor cycling behavior has been observed for electrodes with all three loading densities for these active materials.

Figure 4:
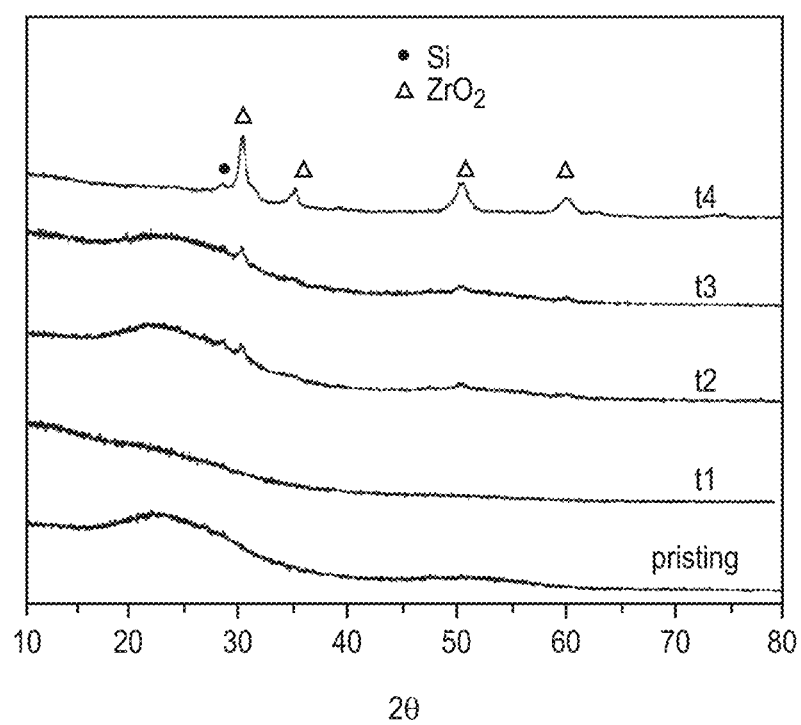
FIG. 4 shows x-ray diffraction (XRD) measurements of SiO after different time periods of high-energy mechanical (HEMM) milling at 300 rpm.

Pristine silicon oxide (325 mesh, Sigma Aldrich) was HEMM ball milled at 300 rpm (revolutions per minute) for 1 to 24 h in ethanol and the physical and cycling behavior of the resulted materials were studied. XRD measurements of these materials with milling times t1-t4 with 1 h<t1<t2<t3<t4<24 h shown in FIG. 4 revealed peaks for crystalline silicon (indicated by black dot) in t2, t3, and t4 samples, indicating at least partial conversion of the amorphous silicon oxide to crystalline silicon after sufficient hours of milling. At extended HEMM ball milling time of t4, $ZrO_2$ contaminants from the HEMM media was observed in the treated sample, indicating the prolonged milling condition may not be favored since $ZrO_2$ would correspond to an inert contaminant in the active material.

Figure 5:
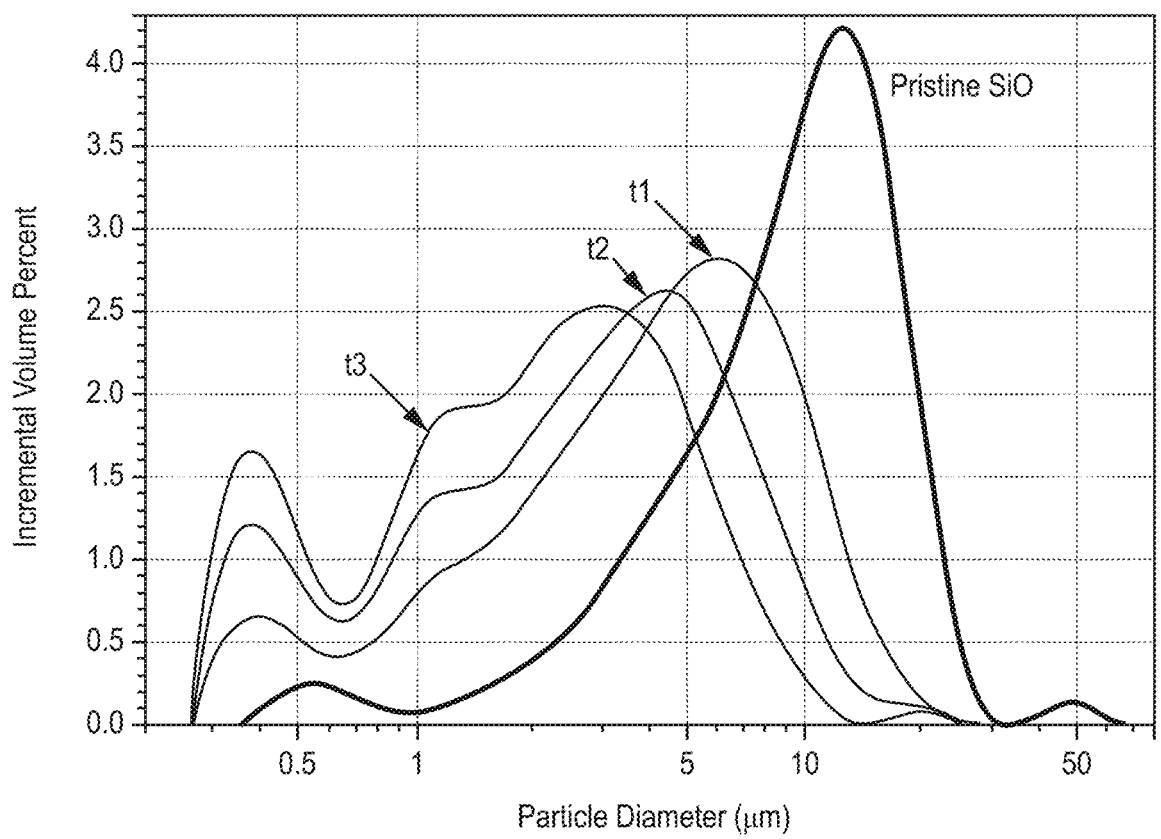
FIG. 5 is incremental volume percent versus particle diameter graph showing particle size distribution of SiO after different time periods of high-energy mechanical milling (HEMM) at 300 rpm.
Figure 6:
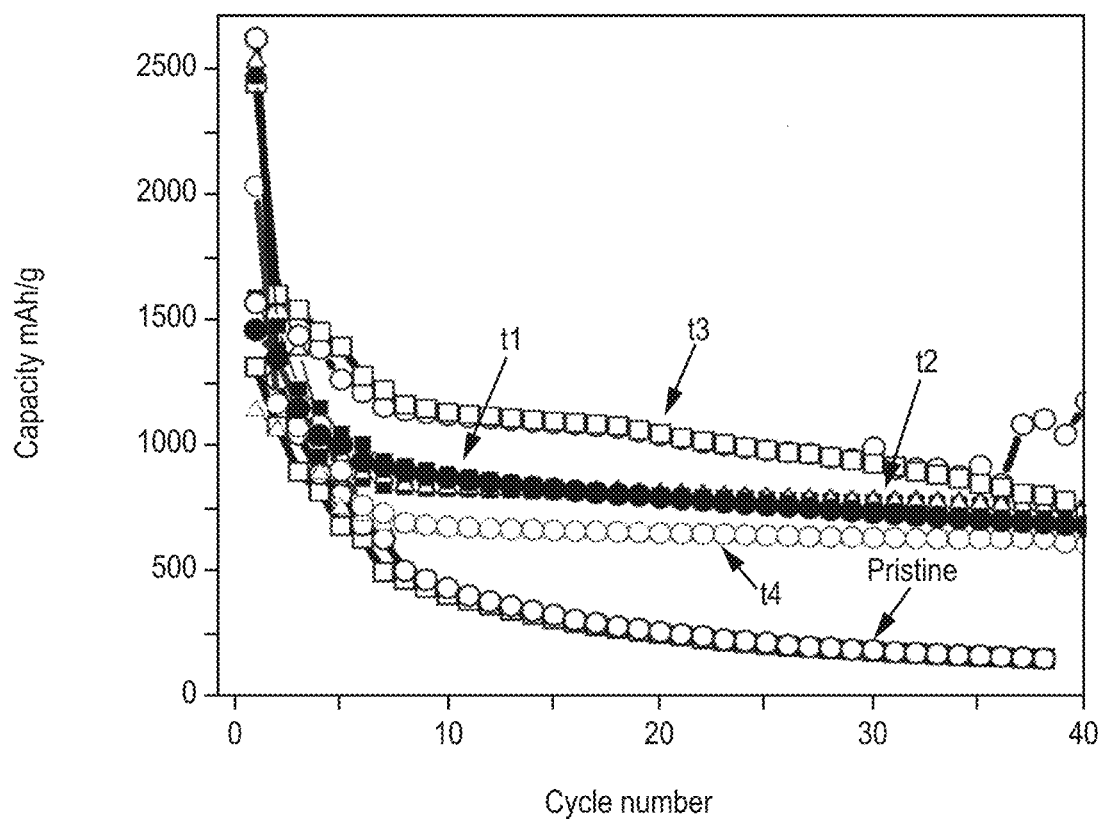
FIG. 6 shows cycling performance of SiO after different time periods of HEMM milled at 300 rpm.

The size distribution of these silicon oxide materials was studied and the results are shown in FIG. 5. The particle sizes were measured using dynamic light scattering for particle dispersions. Specifically, longer time HEMM such as t2 or t3 has produced silicon oxide composite with reduced particle size, including particles with less than micron size. Coin cell batteries were formed with these silicon oxide based materials with a lithium foil counter electrode. The cycling performance of the batteries with these silicon oxide based materials was evaluated and the results are shown in FIG. 6. Milling at 300 rpm for t1 and t2 has produced silicon oxide composite materials with comparable cycling performance, which is significantly better than untreated silicon oxide (labeled pristine). Milling at 300 rpm for t3 produced silicon oxide composite materials with the highest specific capacity, better than t1 and t2 samples, although the battery with the t3 sample experienced the largest percent capacity fade. Prolonged milling at t4 resulted in a material with poorer battery performance, again indicating the prolonged milling condition is not favored. HEMM milling at appropriate rate and length of time therefore improves the cycling behavior of silicon oxide. As micron size silicon oxide particles have shown above in FIGS. 2 and 3 to have poor cycling behavior, HEMM milling has been demonstrated to significantly improve the battery performance of the material, although it is not clear if this improvement is a result of the decrease in particle size and change in the crystal structure or a combination of factors.

To study the effect of heat treatment, silicon oxide and silicon oxide coated with an appropriate carbon source were heated in a furnace in an inert atmosphere per condition provided in table 4. Examples of suitable carbon source are polyvinyl chloride, poly(vinyl chloride)-co-vinyl acetate, polyacrylonitrile (PAN), glucose, sucrose, polymerized furfuryl alcohol, poly[(o-cresyl glycidyl ether)-co-formaldehyde resin, poly(methacrylo-nitrile). The desired organic compositions can be dissolved in a suitable solvent, such as water and/or volatile organic solvents, such as NMP (N-Methyl-2-pyrrolidone) and/or THF (tetrahydrofuran).

TABLE 4

| | Temperature | Time |
|---|---|---|
| Condition 1 ( No Carbon coating) | 600° C. to 1200° | 1 hr to 24 hr |
| Condition 2 (Coated with carbon source) | 600° C. to 1200° | 1 hr to 24 hr |

Figure 7:
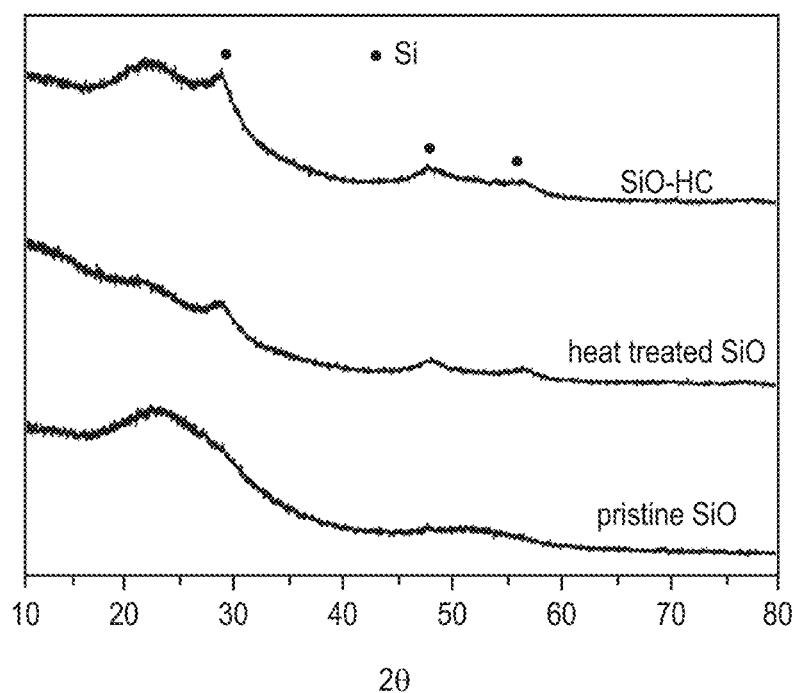
FIG. 7 shows x-ray diffraction (XRD) measurements of SiO after different heating and coating treatment conditions.
Figure 8:
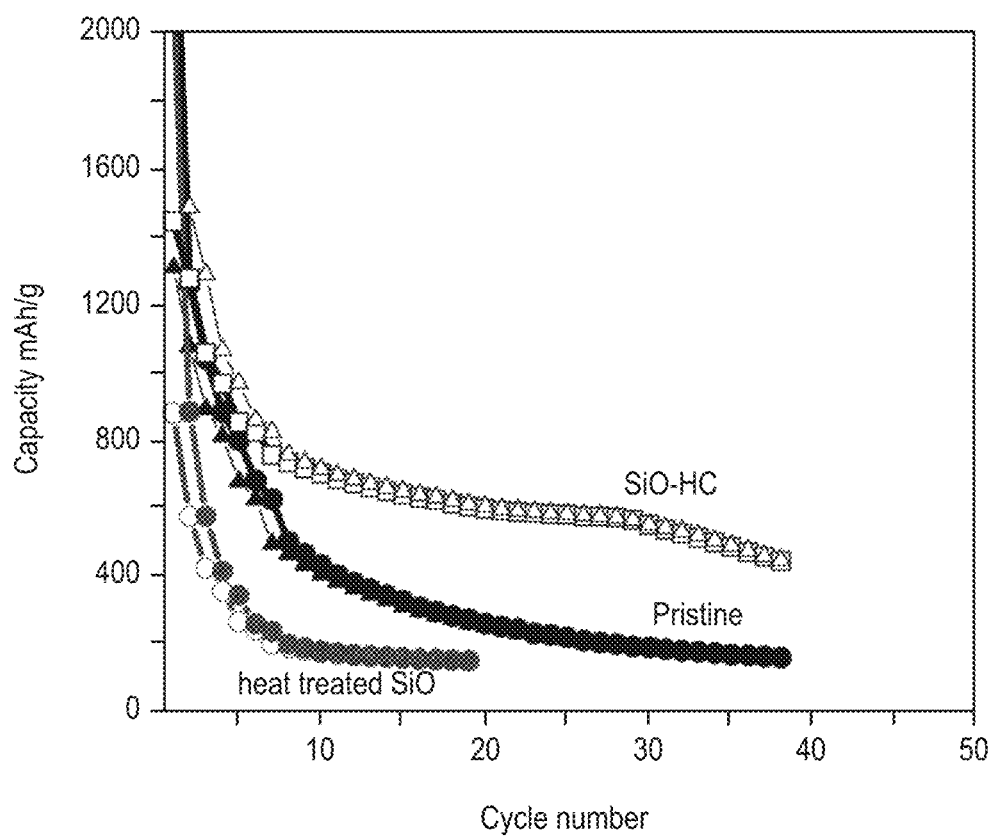
FIG. 8 shows cycling performance of SiO after different heating and coating treatment conditions.

Silicon oxide coated with the appropriate carbon source is known to form silicon oxide coated pyrolytic carbon, e.g., hard carbon, under the specified heat treatment conditions to form a SiO-HC composite material. Heat treated samples together with untreated (pristine) silicon oxide are evaluated with XRD measurements and the results are shown in FIG. 7. Silicon oxide particles without the heat treatment appear to comprise largely of amorphous silicon oxide. Heat treated silicon oxide appear to have similar XRD profile to SiO-HC material, with at least some of the amorphous silicon oxide reduced to crystalline silicon (indicated by black dots). The cycling performance of the heat treated and untreated samples are measured, and the results are shown in FIG. 8. Batteries formed with heat treated silicon oxide sample without carbon coating were observed to have worse cycling performance than batteries formed with untreated silicon oxide samples, while batteries formed with the SiO-HC material has shown significantly improved cycling behavior compared to batteries formed with the untreated sample.

Example 2: Effect of Fluorinated Electrolyte Additive (FEA)

Varied amount of fluorinated electrolyte additive was added to the electrolyte to investigate the effect of the additive on battery performance. Various fluorine containing additives can be used, including fluorine compounds with carbonate structures, such as fluoro ethylene carbonate, fluorine-containing vinyl carbonate, 4-(2,2,3,3-tetrafluoro-propoxymethyl)-[1,3]dioxolan-2-one, 4-(2,2,3,3-tetrafluoro-2-trifluoromethyl-propyl)-[1,3]dioxolan-2-one, bis(2,2,3,3-tetrafluoro-propyl) carbonate, bis(2,2,3,3,3-pentafluoro-propyl) carbonate, or a combination thereof. Positive effect of fluorinated electrolyte additive on both anode and cathode materials has been observed.

Table 5 below shows the effect of fluorinated electrolyte additive (FEA) on the ion conductivity of electrolytes E03 and E07, which contain different ratios of common organic carbonate solvents such as ethylene carbonate (EC), diethyl carbonate (DEC), and dimethyl carbonate (DMC) along with a suitable electrolyte salt. Appropriate electrolytes are described in copending U.S. patent application Ser. No. 12/630,992 now U.S. Pat. No. 8,993,177 to Amiruddin et al., entitled "Lithium Ion Battery With High Voltage Electrolytes and Additives," incorporated herein by reference. It appears that reasonable amounts of fluorinated electrolyte additive do not significantly alter the ionic conductivity of the electrolytes, which is measured in milli-Siemens per centimeter.

TABLE 5

| Amount of FEA in electrolyte | Electrolyte | Pristine electrolyte, mS/cm | FEA added electrolyte, mS/cm |
|---|---|---|---|
| 10 vol % | E07 | 7.8 | 7.77 |
| 10 vol % | E03 | 8.2 | 7.33 |
| 15 vol % | E03 |  | 7.33 |
| 20 vol % | E03 |  | 7.26 |

Figure 9:
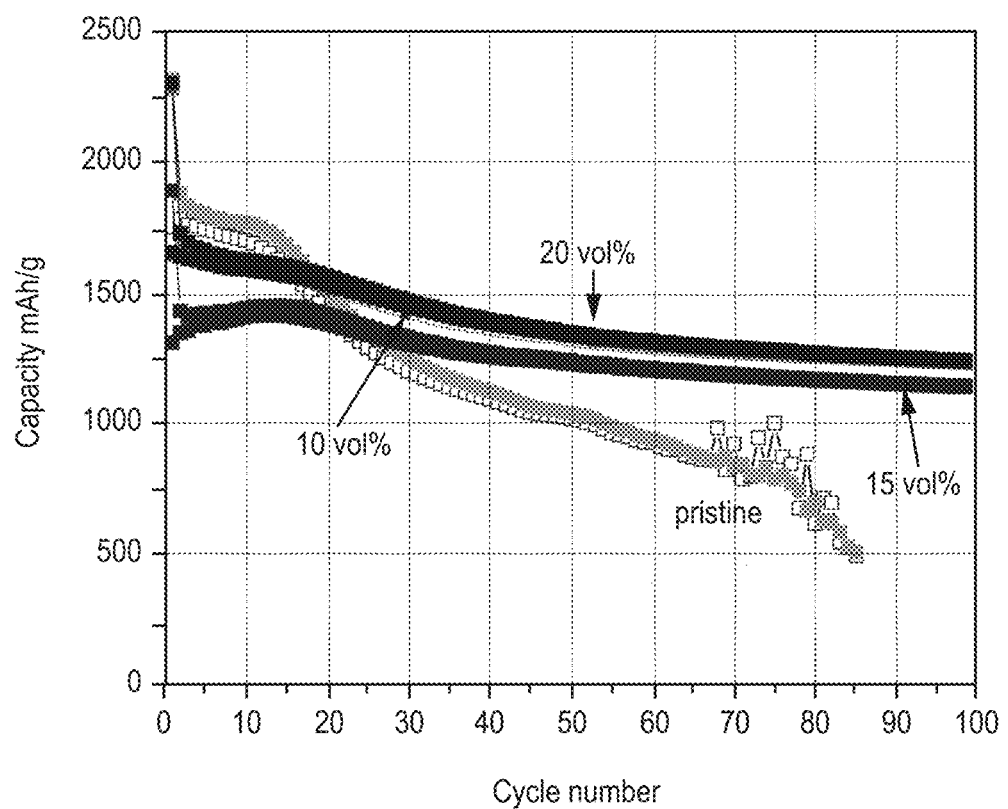
FIG. 9 shows the effect of 10, 15, 20 volume % of fluorinated electrolyte additive (FEA) on Si-based electrode.
Figure 10:
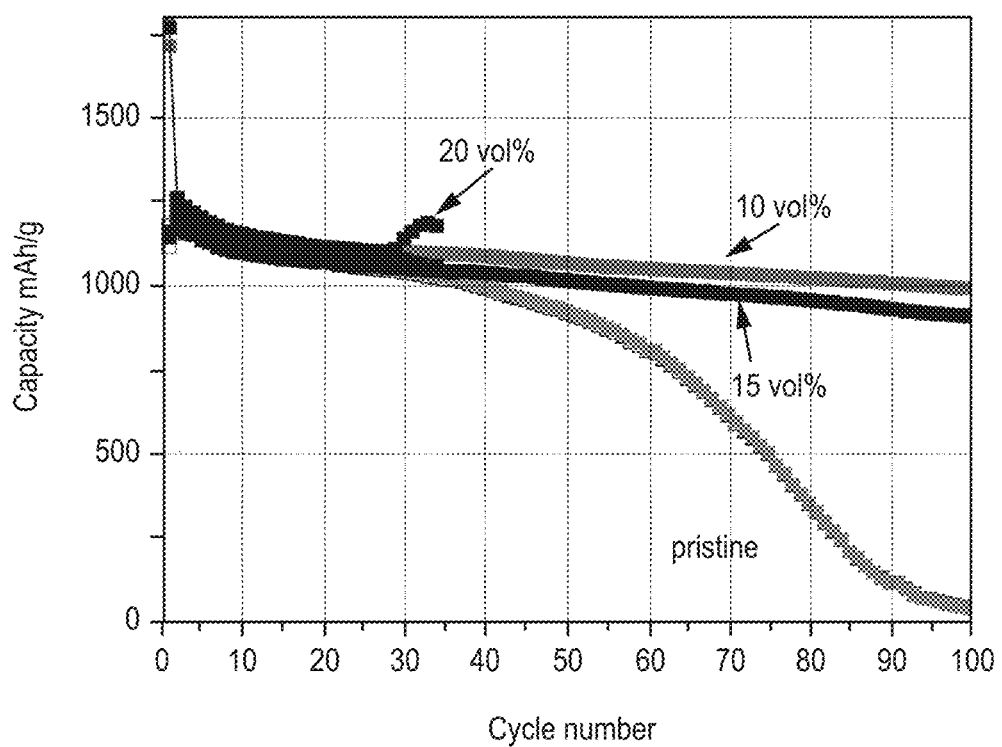
FIG. 10 shows effect of 10, 15, 20 volume % of fluorinated electrolyte additive on SiO composite based electrode.
Figure 11:
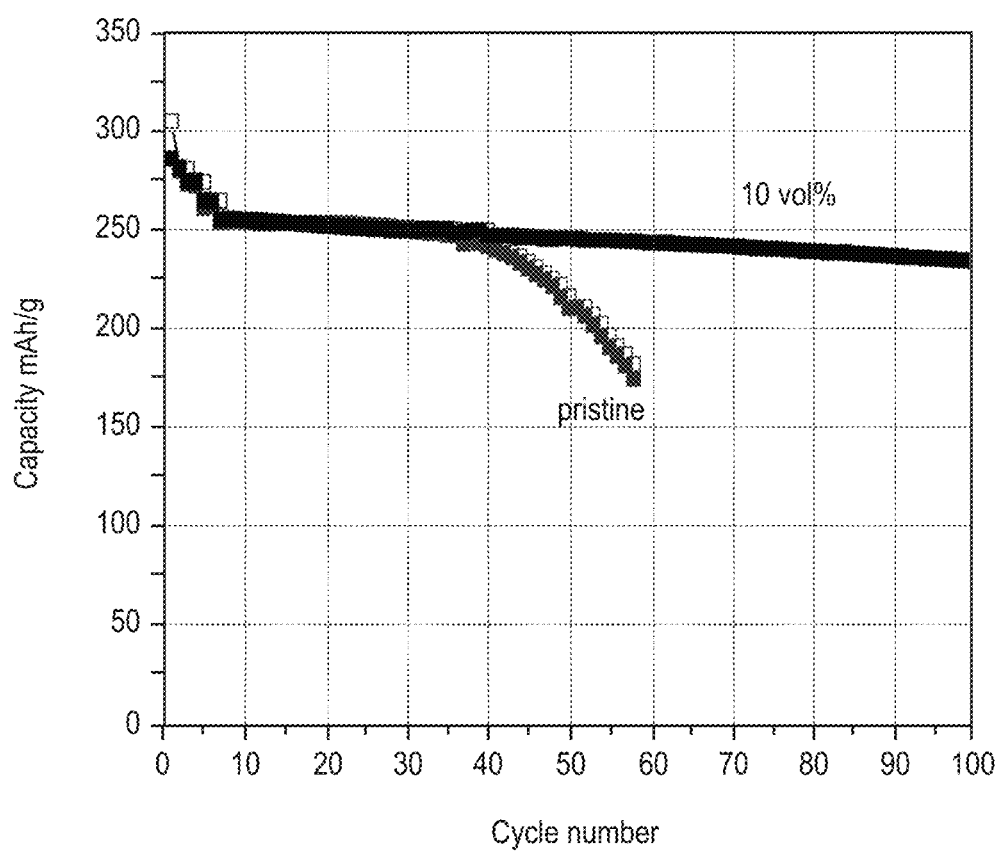
FIG. 11 shows effect of 10 volume % of fluorinated additive on HCMR™ cathode material based electrode.

The effect of FEA on E03 as base electrolyte in batteries with various active materials has been evaluated. The effect of 10, 15, and 20 vol % of FEA on silicon based Si-Gr electrode material has been evaluated together with no additive sample (pristine) in batteries, using a lithium counter electrode and the results are shown in FIG. 9. At all three volume percentages, the additive has appeared to significantly improve the cycling performance of the batteries with silicon oxide based materials compared to the sample with no additive. Similar effect has been observed when silicon oxide composite was used and the results are shown in FIG. 10. The silicon oxide composite material is formed from HEMM at 300 rpm of silicon oxide and graphite followed by blending with a carbon source and heating at 900° C. to form a hard carbon coating to produce the SiO-Gr-HC composite material. FIG. 11 showed the effect of 10 vol % FEA on HCMR™ cathode with lithium anode counter electrode in batteries. FEA added battery has demonstrated higher specific capacity and longer cycling life than the battery without the additive. In general 10 vol % FEA additives showed the best stability and conductivity and was used as a standard amount in high voltage electrolyte used in some of the following examples.

Example 3: Silicon Oxide-Graphite (SiO-Gr) Composites

Silicon oxide particles are HEMM milled with graphite to form a SiO-Gr composite. The physical properties and cycling behaviour of the composites were evaluated together with untreated silicon oxide.

Figure 12:
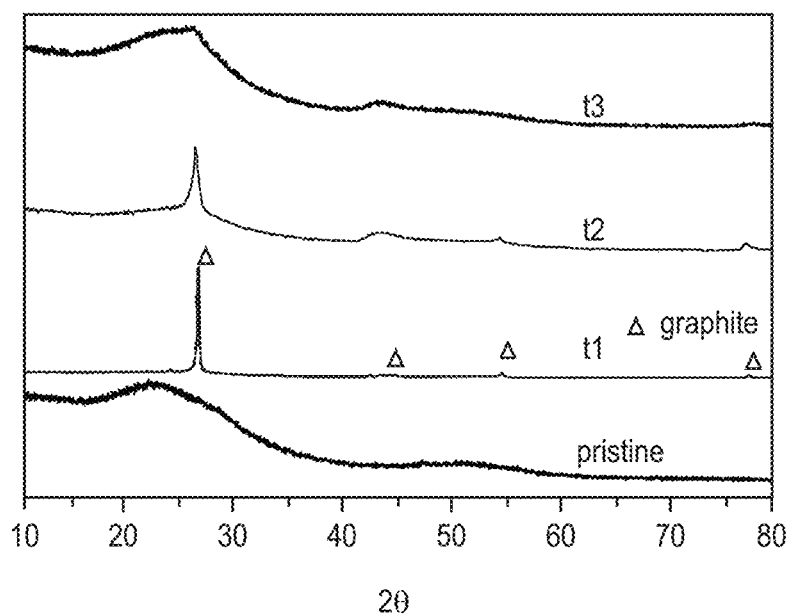
FIG. 12 shows x-ray diffraction measurements of SiO-graphite samples after different time periods of milling at 300 rpm.

Pristine silicon oxide particles (Sigma-Aldrich-325 mesh) were mixed with graphite at 300 rpm using planetary ball milling for three different times t1, t2, and t3, with 1 hr<t1<t2<t3<24 hrs, in a dry state to form SiO-Gr samples. XRD measurements of the samples are shown in FIG. 12. XRD of the t1 sample comprises primarily of crystalline carbon peaks. Longer time milling for t2 has led to the carbon to become less crystalline such that the amorphous SiO background becomes more visible. At longest milling time of t3, an amorphous SiO-Gr composite has formed with no observable crystalline carbon peaks.

As noted above, pre-milled silicon oxide showed improved electrochemical performance relative to pristine silicon oxide. So for the following samples, silicon oxide particles that had been pre-milled in ethanol for t5 hours at 300 rpm by HEMM were mixed with graphite at 300 rpm with HEMM ball milling for t4, t5, t6 or more hours to form SiO-Gr composite samples (1 hr<t4<t5<t6<24 hrs). The composites were used to form four electrodes with loading densities between 2.25 to 3.29 mg/cm$^2$, which is used to build batteries with lithium counter electrode. Specifically, sample 1 composite was milled t5 hours and the loading density of the electrode formed was 2.25 mg/cm$^2$. Sample 2 composite was milled for t6 hours and the loading density of the electrode formed was 2.24 mg/cm$^2$. Sample 3 was milled for t5 hours and the loading density of the electrode formed was 3.16 mg/cm$^2$. Sample 4 was milled for t4 hours and the loading density of the electrode formed was 3.29 mg/cm$^2$.

Figure 13:
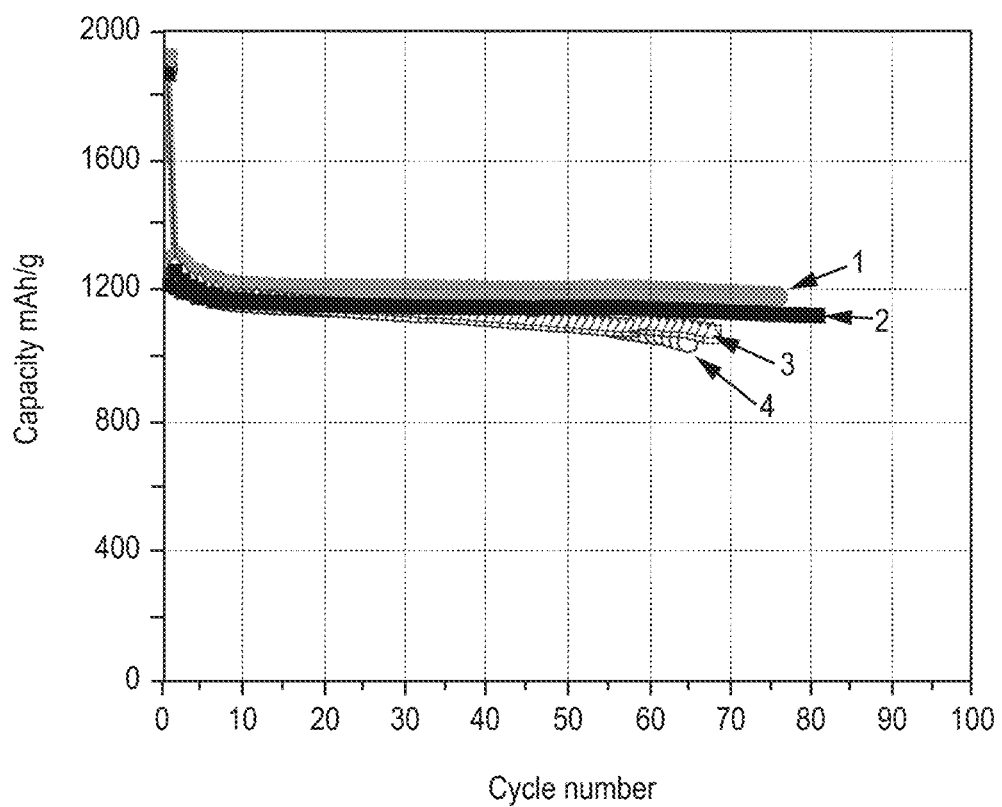
FIG. 13 shows cycling performance of SiO-graphite composite at varied loading densities of 2.25-3.29 mg/cm².

FEA (10 vol %) has been added into the electrolyte used in the battery comprising E03. The cycling performance of these batteries evaluated and the results are shown in FIG. 13. The SiO-Gr composites have demonstrated improved cycling performance compared to the untreated silicon oxide material.

Figure 14:
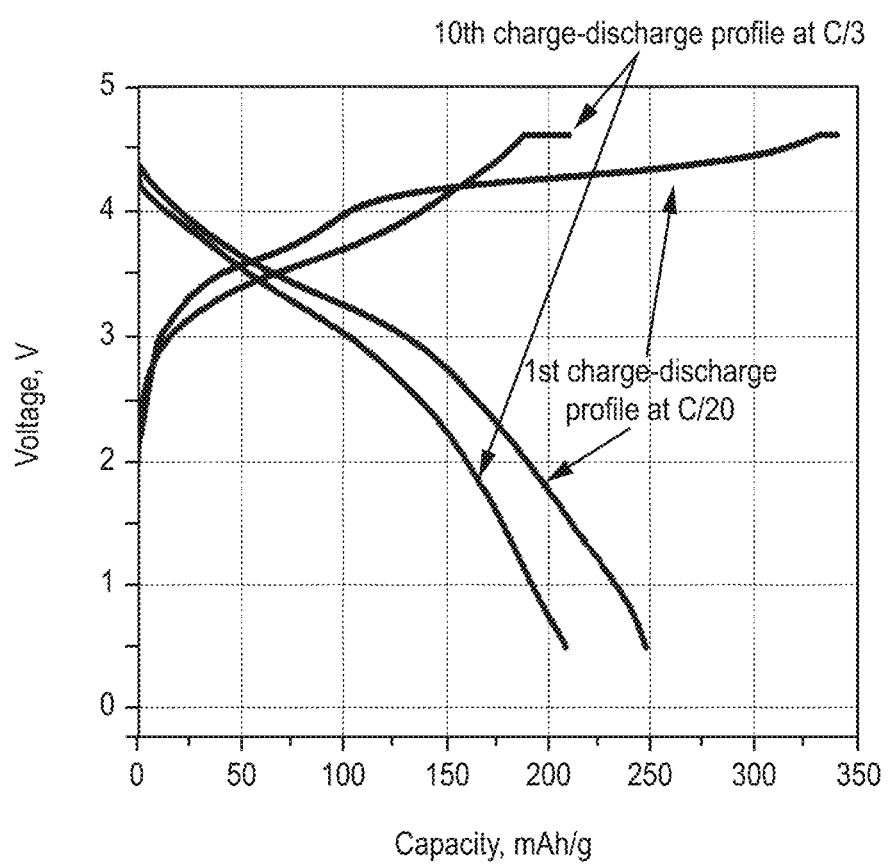
FIG. 14 shows charge/discharge profile of a battery with SiO-graphite composite based anode and HCMR™ active material based cathode.

Also, silicon oxide particles (55-70 wt %, Sigma-Aldrich, 325 mesh) were mixed with graphite (30-45 wt %) at 300 rpm with HEMM ball milling for t1 hr to form a SiO-Gr composite sample. The composites were used to form electrodes, which is used to build a battery with HCMR™ used as the active material for the positive electrode. The battery was cycled between 4.5V to 0.5V after the first cycle charge to 4.6V, at a balance of anode capacity to cathode capacity of 142% and the $1^{st}$ and the $10^{th}$ cycles charge-discharge profiles based on cathode are shown in FIG. 14. The SiO-Gr composite has maintained about 85% of capacity at the $10^{th}$ cycle compared to the $1^{st}$ cycle.

Example 4: Silicon Oxide-Hard Carbon Composites

This example demonstrates the performance of coin cell batteries fabricated from electrodes formed from negative electrode active materials comprising SiO-hard carbon composites (SiO-HC).

Composite precursor materials were prepared by ball milling. In particular, an appropriate amount of powdered silicon oxide particles (Sigma-Aldrich, 325 mesh) is subjected to ball milling for 1 hr to 24 hr at a milling rate of 300 rpm. For a given amount of silicon oxide, to obtain the appropriate amount by weight of carbon coating (3%-35%), the required amount of carbon source is dissolved in tetrahydrofuran (THF) to form a solution. The ball milled silicon oxide particles is added to the solution and mixed thoroughly for 2 hrs to 12 hrs with a magnetic stirrer. The mixture is then dried over night to evaporate all the THF. The solid obtained is transferred into an alumina boat and heat treated in a tube furnace between 700° C. to 1200° C. for 1 hr to 24 hr under argon atmosphere. The SiO-HC composite material is then collected and sieved.

Figure 15:
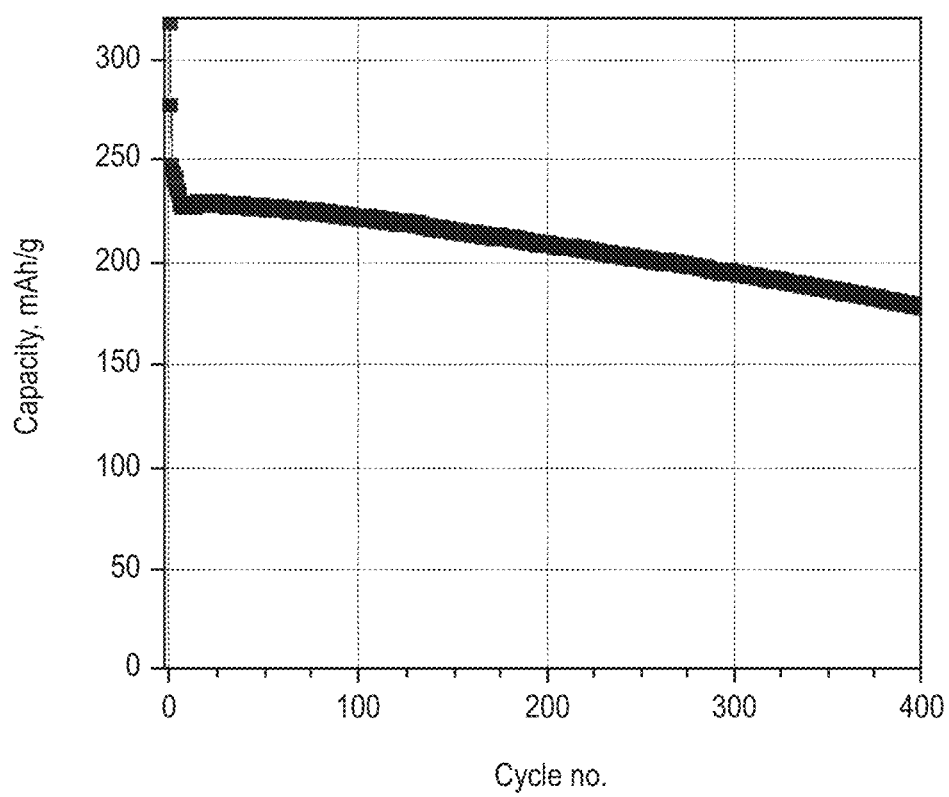
FIG. 15 shows cycling performance of a battery with SiO-Gr-HC composite based anode and HCMR™ active material based cathode.

A battery was assembled with an anode comprising the SiO-HC composite across from a high capacity HCMR™ cathode in a coin cell The anode was coated with supplemental lithium to compensate for the first cycle IRCL of the anode. The cycling performance of the battery is plotted in FIG. 15 showing 400 charge-discharge cycles, where cycle 1 is cycled at a C/20 rate, cycles 2-3 at C/10, cycles 4-5 at C/5 and cycles 6-400 at a C/3 rate. The first discharge capacity of the coin cell at C/3 is about 235 mAh/g with a capacity retention of about 80% in 380 cycles.

Example 5: Effect of Pre-Lithiation

Figure 16:
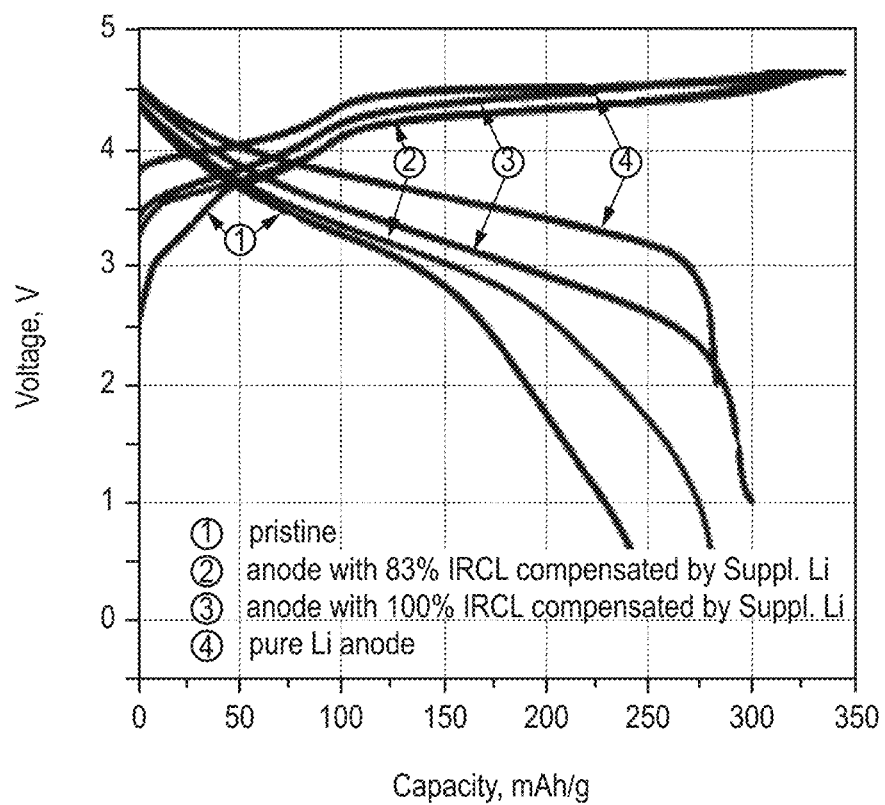
FIG. 16 shows the effect of supplemental lithium on charge/discharge plots for SiO-based composite.

The effect of SLMP™ on the charge/discharge profile and cycling performance of SiO-Gr-HC composite based anodes were studied and the results are shown in FIG. 16 and the Tables 6 and 7 below.

SiO-Gr-HC composite was used to form an electrode with 3.7 mg/cm2 density and supplemental lithium (SLMP™) on the 1.54 cm² electrode. The SiO-Gr-HC composite based electrode was cycled against a HCMR™ cathode and the results are shown in Tables 6 and 7 below for specific capacity data obtained based on cathode active material mass or anode active material mass, respectively. Similar to the results obtained for SiO-Gr based electrode, the addition of SLMP™ on SiO-Gr-HC based electrode has shown to increase the charge discharge capacity and increase the average voltage of the battery at different cycling rate. The charge-discharge plots at a C/20 rate are shown in FIG. 16. The average voltages from the results in FIG. 16 are 2.90V (pristine, 4.6V-0.5V), 2.94V (83% compensated, 4.6V-0.5V), 3.18V (100% compensated, 4.6V-1.V) and 3.63 (Li anode). It can be seen that the SLMP™ can effective eliminate the IRCL from the anode since results comparable to those obtained with a Li anode were obtained. The remaining IRCL can be attributed to the cathode.

TABLE 6

| Based on Cathode | With Supplemental Li (4.6/4.5 V-2.0 V) | Without Supplemental Li (4.6/4.5 V-1.5 V) |
| --- | --- | --- |
| Avg. V - C/20 (1st cycle, 4.6 V) | 3.50 | 3.13 |
| Avg. V - C/10 (4.5 V) | 3.465 | 3.14 |

TABLE 6-continued

| Based on Cathode | With Supplemental Li (4.6/4.5 V-2.0 V) | Without Supplemental Li (4.6/4.5 V-1.5 V) |
| --- | --- | --- |
| Avg. V - C/3 (4.5 V) | 3.42 | 3.10 |
| Charge Capacity - C/20 | 329 | 298 |
| Discharge Capacity - C/20 | 268 | 214 |
| Charge Capacity - C/3 | 238 | 224 |
| Discharge Capacity - C/3 | 225 | 183 |
| Excess anode % | 11% | 25% |

TABLE 7

| Based on Anode | With Supplemental Li (4.6/4.5 V-2.0 V) | Without Supplemental Li (4.6/4.5 V-1.5 V) |
| --- | --- | --- |
| Charge Capacity - C/20 (1st cycle - 4.6 V) | 1436 | 1443 |
| Discharge Capacity - C/20 | 1170 | 1036 |
| Charge Capacity - C/3 (4.5 V) | 1039 | 1084 |
| Discharge Capacity - C/3 | 982 | 886 |

A small portion of the average voltage differences in performance noted in Tables 6 and 7 can be attributed to the difference in voltage ranges, but significant portion of the differences are due to the presence of supplemental lithium.

Example 6: SiO-Carbon Nanofiber (SiO-CNF) Based Composites

This example demonstrates the performance of coin cell batteries fabricated from electrodes formed from negative electrode active materials comprising SiO-Carbon nanofiber (SiO-CNF) based composites.

Carbon nanofibers (CNFs) were added to silicon oxide to enhance rate capability and the cycling stability of the composite electrodes. Specifically, $\alpha$SiO-$\epsilon$CNF (where $0.5<\alpha<0.95$ and $0.05<\epsilon<0.50$) is formed by mixing appropriate amount silicon oxide particles with carbon nanofibers using a jar mill. The required materials were mixed in a plastic jar with some zirconia milling balls. The jar was allowed to mix for one hour and the contents of the jar were collected for anode preparation process. There is no sieving step involved after the Jarmill mixing process.

The SiO-CNF composite negative electrode active material was formed into SiO-CNF electrode as describe above. For comparison, pristine SiO powder was also formed into SiO electrode. The cycling performances of these two electrodes are evaluated in batteries with lithium foil counter electrode described above and the results are shown in Table 8 below. The SiO-CNF battery exhibited significant improvement with capacity retention both at initial C/3 cycle and after cycling for 50 cycles.

TABLE 8

| Sample | IRCL | Specific Capacity at Initial C/3 Cycle (mAh/g) | Capacity Fade After 50 Cycles |
| --- | --- | --- | --- |
| SiO | 33% | 136 | 90% |
| SiO—CNF | 40% | 1083 | 24% |

Example 7: SiO-Metal Based Composite Materials with or without CNF

Figure 17:
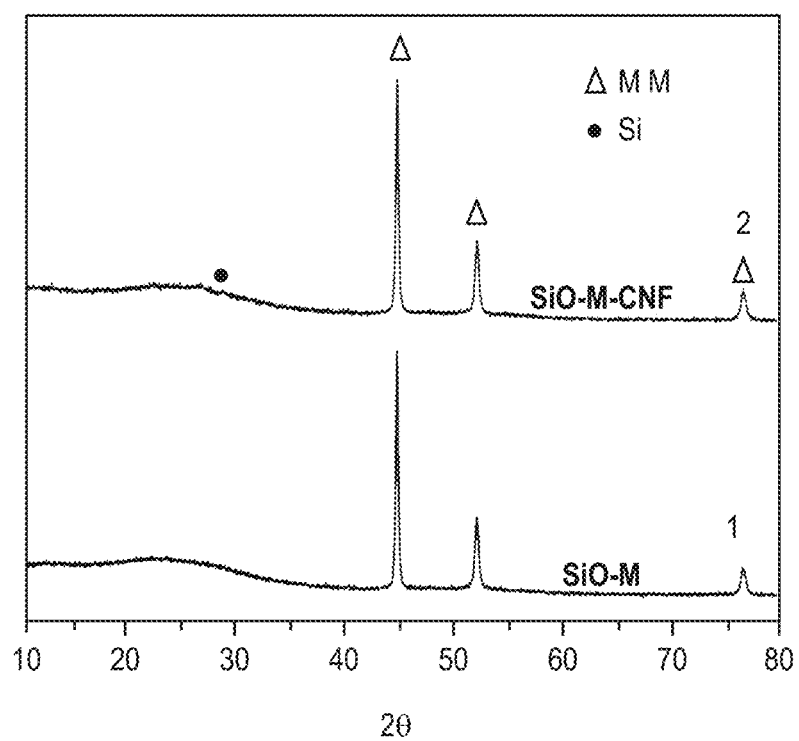
FIG. 17 shows XRD measurements of SiO-metal (SiO-M) and SiO-metal-carbon nano fiber (SiO-M-CNF) composites.

This example studies the performance of silicon oxide based composites with inert metal powders, as described above. A composite of αSiO-δM where 0.5<α<0.95 and 0.05<δ<0.55 was prepared by HEMM ball milling at a speed of 300 rpm for 1-24 hr to form a first composite. An appropriate amount of carbon nanofiber (CNF) was added to the first composite and milled for an additional 1-24 hours at 300 rpm to form a second composite with αSiO-δM-εCNF where 0.5<α<0.9, 0.05<δ<0.35 and 0.05<ε<0.50). FIG. 17 showed the XRD of SiO-M composite and SiO-M-CNF composite. No crystalline SiO-M was observed in either composite sample.

Figure 18:
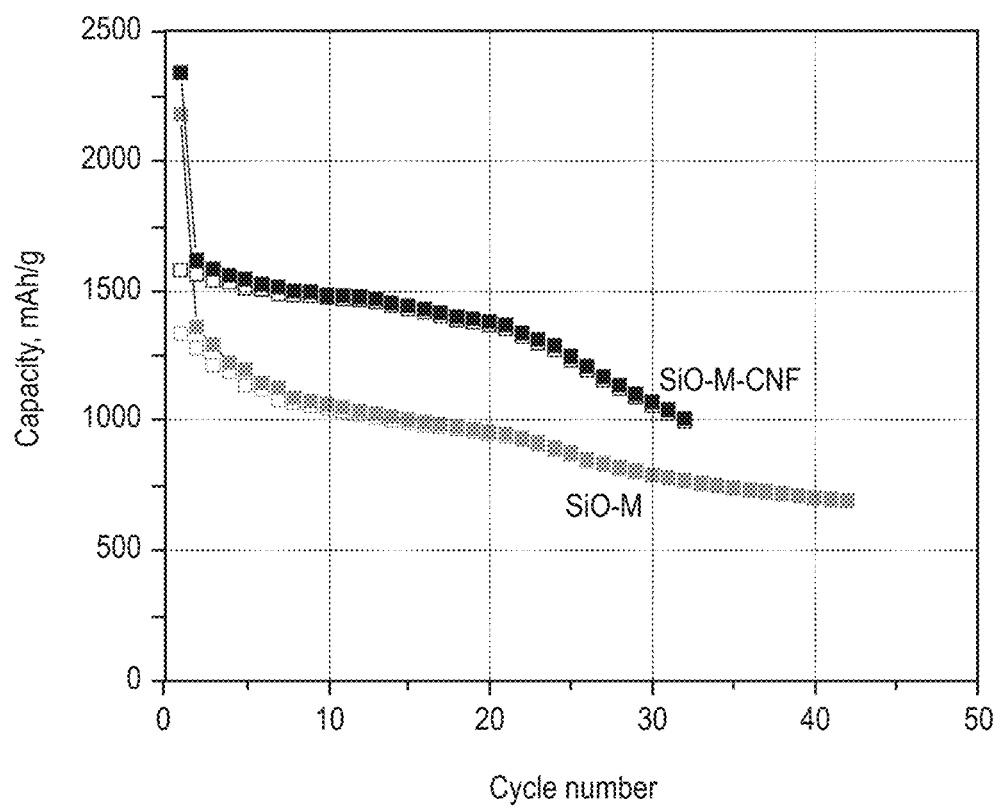
FIG. 18 shows cycling performances of batteries with SiO-M and SiO-M-CNF based electrode and lithium metal counter electrode.

The SiO-M composite and the SiO-M-CNF composite were formed into electrodes and the electrochemical performances of the electrodes were evaluated against lithium foil and the results are shown in FIG. 18. The SiO-M-CNF based electrode appears to have improved IRCL and overall cycling specific capacity compared to SiO-M based electrode.

Figure 19:
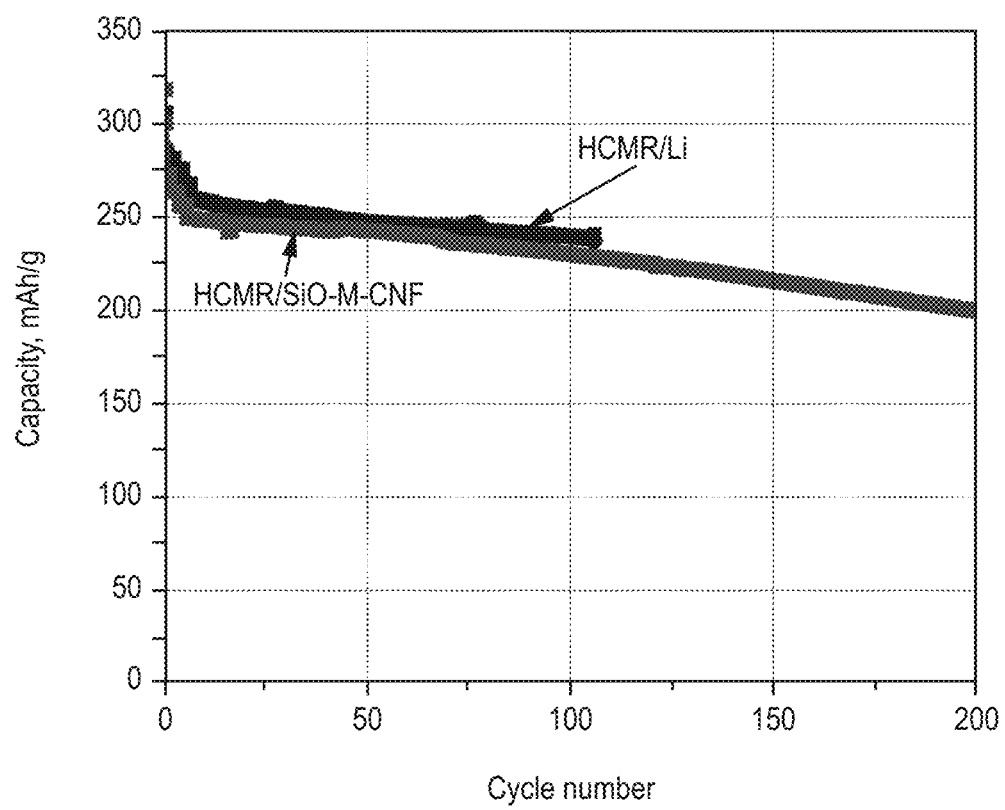
FIG. 19 shows cycling performance of a battery with SiO-M-CNF based anode and HCMR™ cathode compared with a battery with lithium metal anode and HCMR™ cathode.
Figure 20:
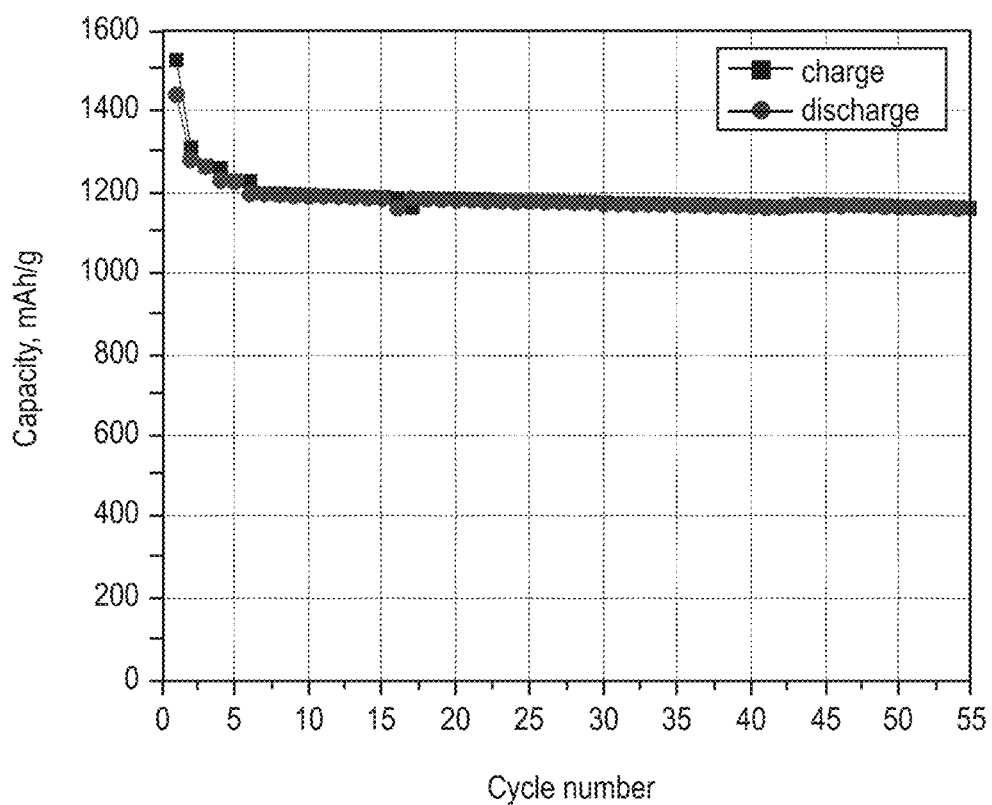
FIG. 20 shows charge/discharge profile of a battery with SiO-M-CNF based anode and HCMR™ cathode at different cycles.

The SiO-M-CNF composite was also evaluated against HCMR™ cathode and the results are shown in FIG. 19 and FIG. 20. The anode has a SiO-M-CNF loading density of 2.1 mg/cm$^2$ with supplemental lithium powder (SLMP™) lithium powder added on the surface of anode as described above and a balance of 150% anode capacity compared to cathode capacity. The electrolyte used in the battery comprised 10 vol % fluorinated electrolyte additive in the electrolyte. FIG. 19 showed the cycling performance of SiO-M-CNF based electrode against the HCMR™ cathode calculated based on the weight of cathode active material. The same HCMR™ cathode cycled against lithium foil electrode is also included for comparison. The SiO-M-CNF based electrode appears to have comparable cycling performance as the lithium foil against the HCMR™ based cathode, maintaining specific cycling capacity above 225 mAh/g beyond 100 cycles.

Figure 21:
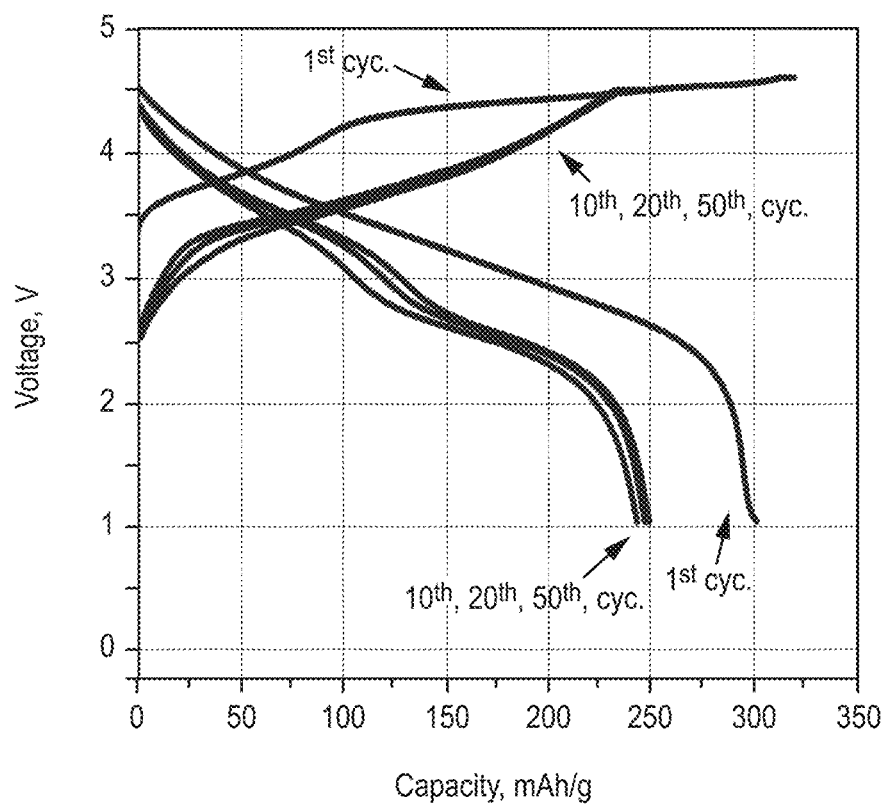
FIG. 21 shows cycling performance of a battery with SiO-M-CNF based anode and HCMR™ cathode.

The detailed charge/discharge profile of the SiO-M-CNF/HCMR battery based on the weight of cathode active material was additionally shown in FIG. 19. FIG. 20 showed the cycling performance of SiO-M-CNF based electrode against the HCMR™ cathode calculated based on the weight of anode active material. The SiO-M-CNF based electrode appears to maintain specific cycling capacity above 1150 mAh/g after 55 cycles. The irreversible capacity loss appeared to be 85 mAh/g (<200 mAh/g). The capacity retention after 50 cycles at a C/3 rate is 97%. FIG. 21 shows charge/discharge profiles for the 1st, 10th, 20th and 50th cycles of the battery, indicating that it has comparable charge and discharge profiles at the 10th, 20th and 50th cycles.

Figure 22:
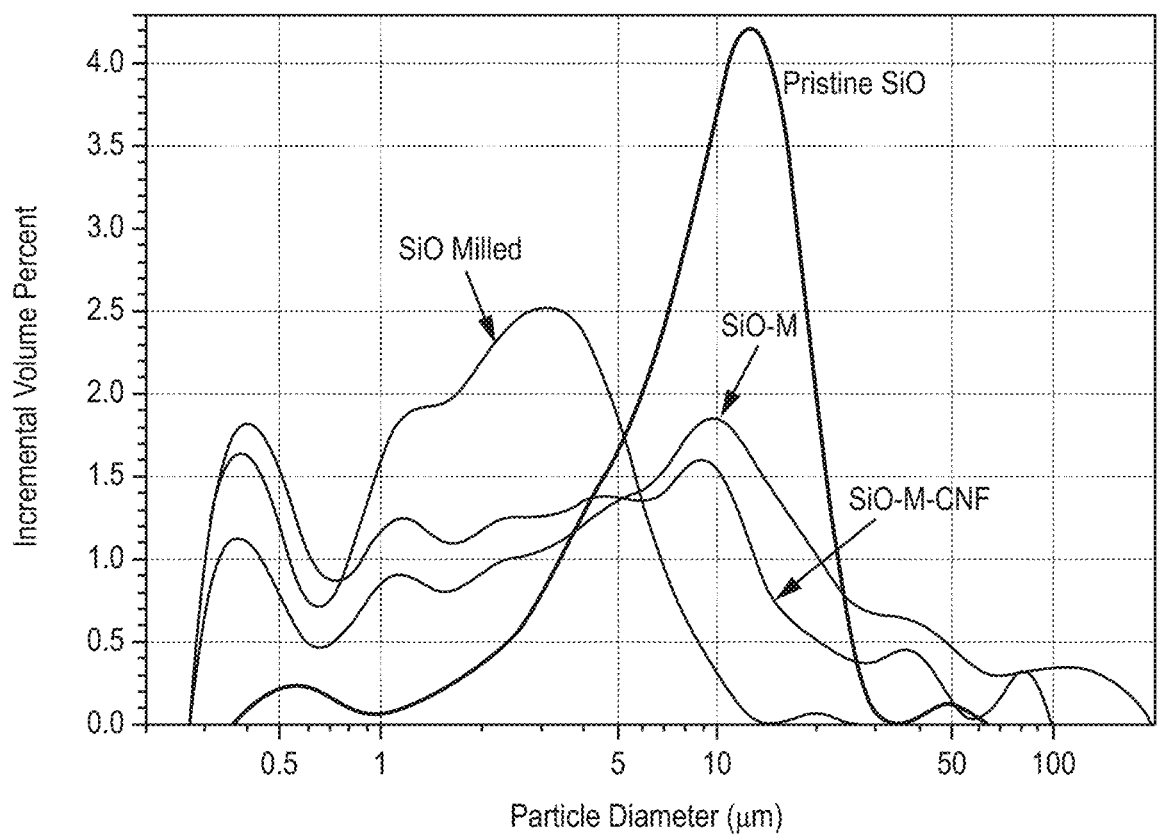
FIG. 22 shows a graph of incremental volume percent versus particle diameter showing the particle diameter profiles of pristine SiO, SiO and SiO-M HEMM milled at 300 rpm, and SiO-M HEMM milled mixed with CNF followed by additional milling at 300 rpm.
Figure 23:
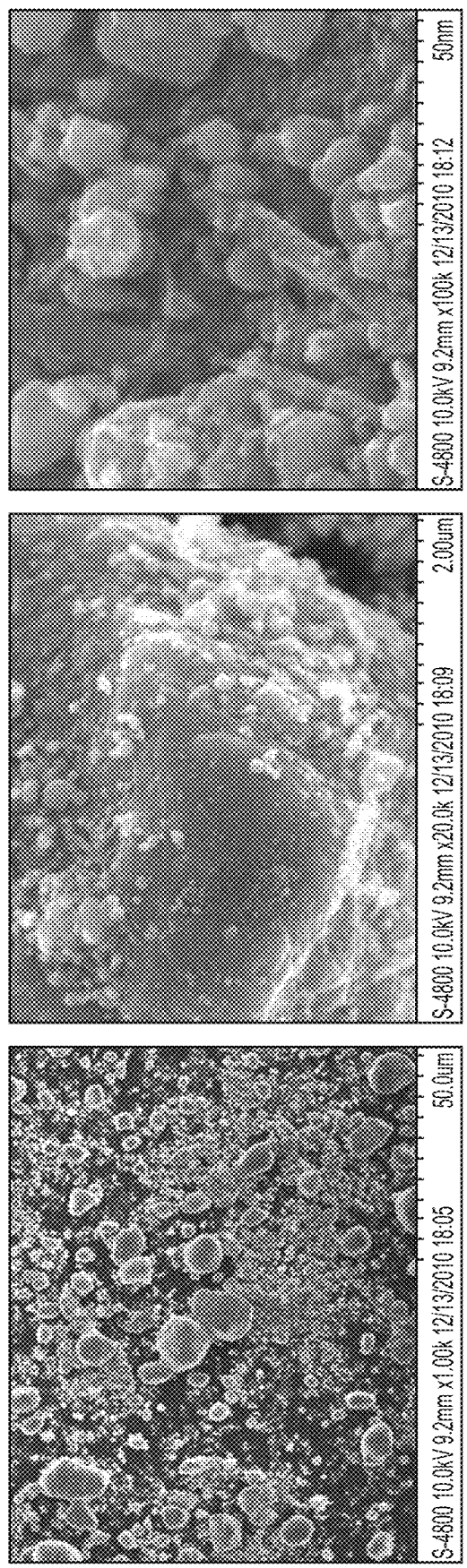
FIG. 23 shows scanning electron microscopy (SEM) images of SiO-M-CNF composite at different magnifications.

A separate study was performed to evaluate the effect of milling on the size of the particles and the results are shown in FIG. 22. After milling at 300 rpm for 1-24 hours, the size of silicon oxide particles is reduced significantly compared to the pristine sample, which is consistent with the milling studies carried out in Example 1. The SiO-M sample showed similar size distribution after adding 10% CNF and milling for additional 1-24 hours at 300 rpm to form SiO-M-CNF composites. The SiO-M-CNF composite thus formed is studies with SEM at different magnifications and the results are shown in FIG. 23.

Example 8: SiO-Gr-HC-Si Composite with and without CNF

Figure 24:
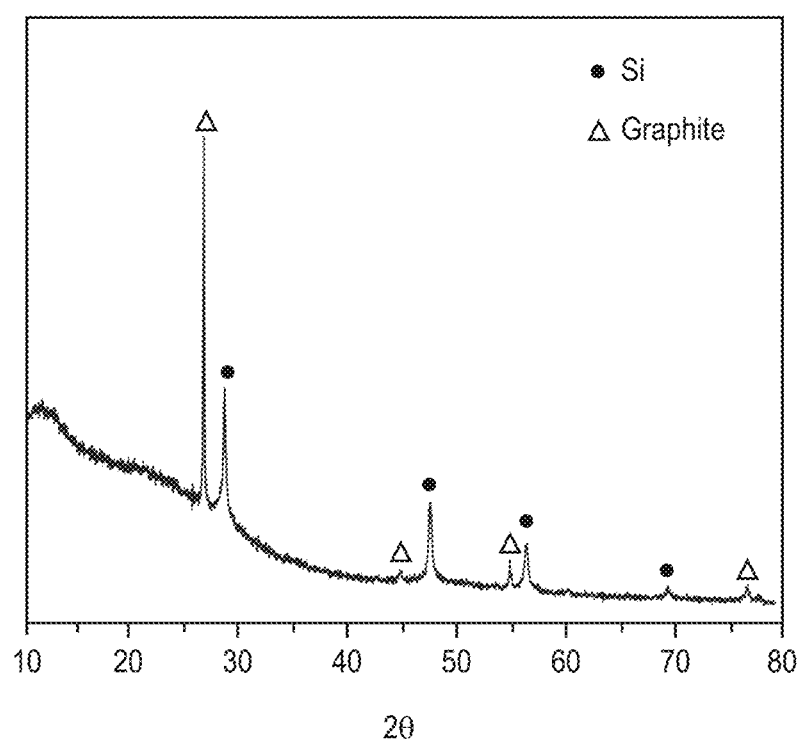
FIG. 24 shows XRD measurements of SiO-Gr-HC-Si composite.
Figure 25A:
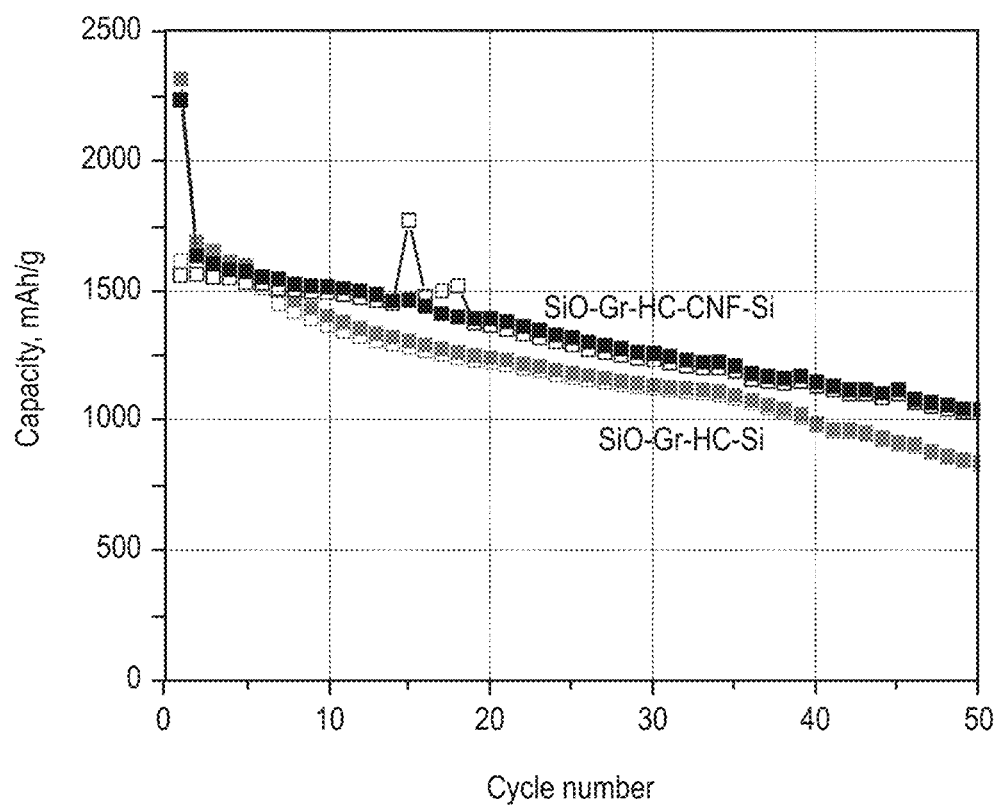
FIG. 25A shows cycling performance of SiO-Gr-HC-Si composite with or without carbon nano fibers.
Figure 25B:
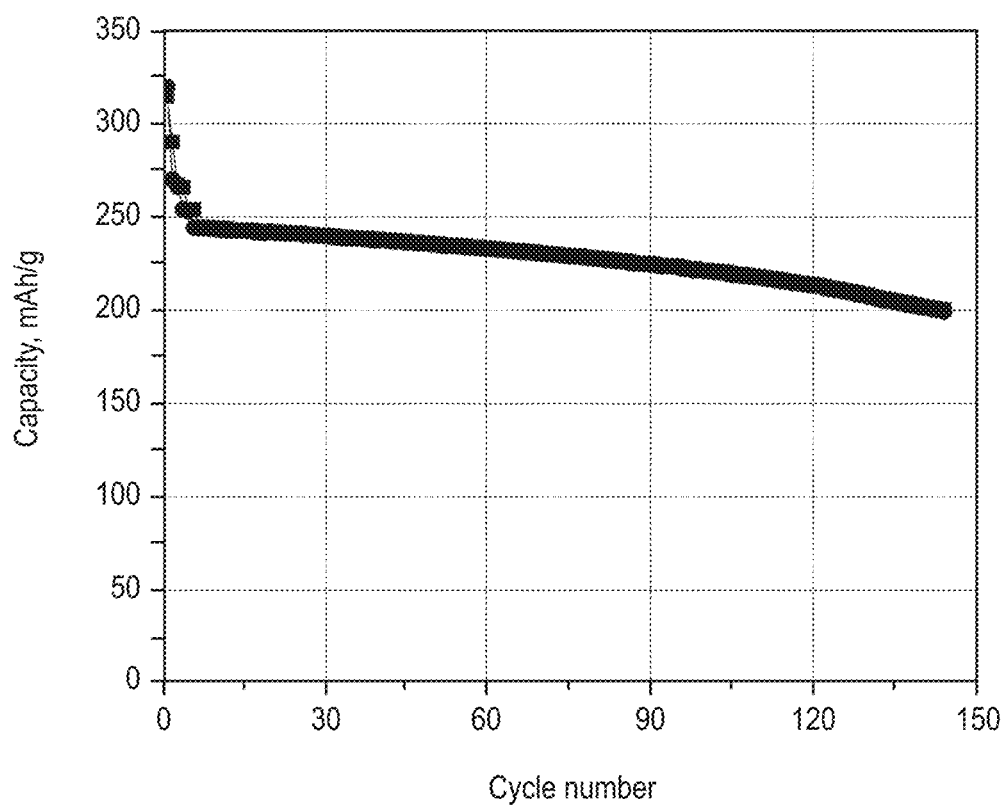
FIG. 25B shows cycling performance of a battery with SiO-Gr-HC-Si composite based anode and HCMR™ cathode based upon the mass of the positive electrode active material.

This example is directed to examining active material composites with both silicon oxide and silicon. Silicon oxide milled at 300 rpm HEMM was combined with nano amorphous silicon and graphite and milled for at 300 rpm by HEMM. The resulting mixture is then carbonized at 900° C. for 1-24 h in an Argon environment with the appropriate hard carbon source, such as poly vinyl chloride, poly(vinyl chloride)-co-vinyl acetate, polyacrylonitrile, glucose, sucrose, polymerized furfuryl alcohol, poly[(o-cresyl glycidyl ether)-co-formaldehyde resin, poly(methacrylo-nitrile), a combination thereof to form a composite material. XRD measurements of the composite material are shown in FIG. 24, and these results reveal the formation of at least some crystalline silicon in the composite. The resulting composite can be represented by a formula αSiO-βGr-χHC-φSi where 0.4<α<0.75, 0.05<β<0.25, 0.01<χ<0.20, and 0.01<φ<0.50. A portion of the SiO-Gr-HC-Si composite material was then mixed with CNF and jar milled to form a αSiO-βGr-χHC-εCNF-φSi composite where 0.4<α<0.75, 0.05<β<0.25, 0.01<χ<0.2, 0.01<ε<0.2 and 0.01<φ<0.5. Both the SiO-Gr-HC-Si composite and the SiO-Gr-HC-CNF-Si composite were formed into electrodes and cycled against a lithium foil electrode and the results are shown in FIG. 25A. The SiO-Gr-HC-CNF-Si composite formed electrode appeared to have improved cycling performance compared to the SiO-Gr-HC-Si composite formed electrode. The SiO-Gr-HC-CNF-Si composite was additionally cycled against a HCMR™ cathode and the results are shown in FIG. 25B.

Figure 25C:
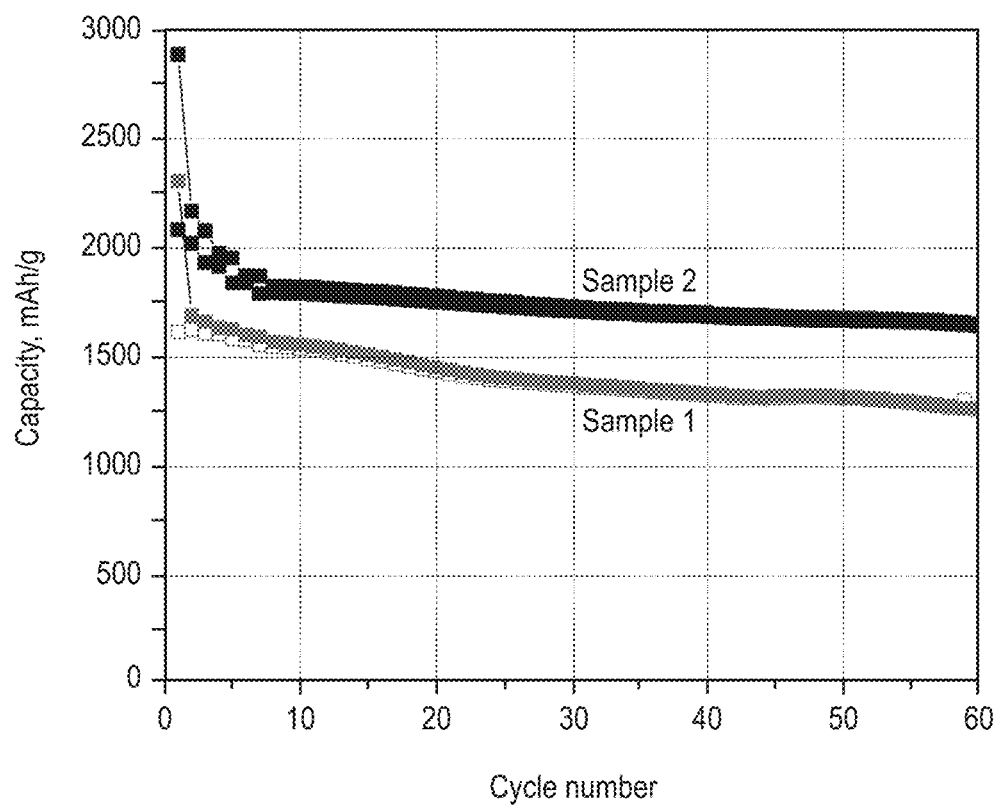
FIG. 25C shows cycling performance of SiO-Gr-HC-Si composites at different compositions.

Two composite materials with varied amounts of SiO, Si, Gr, and HC were synthesized: sample 1 has a composition with relatively less Si relative to SiO and sample 2 has a composition containing higher silicon concentration relative to SiO. Samples 1 and 2 had similar amounts of Gr and HC. The cycling performance of electrodes formed from samples 1 and 2 were tested against a lithium foil counter electrode and the results are shown in FIG. 25C. The sample with higher silicon ratio, sample 2, appears to have better cycling performance, maintaining specific capacity above 1600 mAh/g after 60 cycles. All tested batteries had 10 vol % fluorinated additive added to the electrolyte used in the battery.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

This document was prepared as a result of work sponsored by the California Energy Commission. It does not necessarily represent the views of the Energy Commission, its employees, or the State of California. The Commission, the State of California, its employees, contractors, and subcontractors make no warranty, express or implied, and assume no legal liability for the information in this document; nor does any party represent that the use of this information will not infringe upon privately owned rights.

What is claimed is:

1. A lithium ion battery comprising a positive electrode comprising a lithium metal oxide, a negative electrode, a separator between the positive electrode and the negative electrode, and an electrolyte comprising lithium ions and from about 5 volume percent to about 18 volume percent halogenated carbonate, wherein the negative electrode comprises particulate silicon oxide based active material comprising a silicon oxide carbon composite composition, wherein the silicon oxide carbon composite composition comprises silicon oxide having an amorphous carbon coating and is preloaded with lithium within the active material in a particulate form with no additional supplemental lithium in the battery at assembly, and wherein the negative electrode further comprises from about 1 weight percent to about 30 weight percent electrically conductive additive comprising graphite powder and carbon black.

2. The lithium ion battery of claim 1 wherein the negative electrode comprises silicon oxide with the structure of $SiO_x$, $0.1 \leq x \leq 1.5$.

3. The lithium ion battery of claim 1 wherein the halogenated carbonate comprises fluoroethylene carbonate, fluorinated vinyl carbonate, monochloro ethylene carbonate, monobromo ethylene carbonate, 4-(2,2,3,3-tetrafluoro-propoxymethyl)-[1,3]dioxolan-2-one, 4-(2,3,3,3-tetrafluoro-2-trifluoro methyl-propyl)-[1,3]dioxolan-2-one, 4-trifluoromethyl-1,3-dioxolan-2-one, bis(2,2,3,3-tetrafluoro-propyl) carbonate, bis(2,2,3,3,3-pentafluoro-propyl) carbonate, or mixtures thereof.

4. The lithium ion battery of claim 1 wherein the halogenated carbonate comprises fluoroethylene carbonate, and wherein the negative electrode has a specific discharge capacity of at least about 700 mAh/g at a rate of C/3 based on negative electrode active material mass.

5. The lithium ion battery of claim 1 wherein the particulate silicon oxide based active material is preloaded with the lithium to at least about 10% of a negative electrode capacity.

6. The lithium ion battery of claim 1 wherein the lithium metal oxide comprises $LiCoO_2$.

7. The lithium ion battery of claim 1 wherein the lithium metal oxide comprises $LiMO_2$, where M is one or more metals with an average oxidation state of +3.

8. The lithium ion battery of claim 1 wherein the lithium metal oxide is represented by the formula $Li_{1+b}Ni_\alpha Mn_\beta Co_\gamma A_\delta O_{2-z}F_z$, where b ranges from about 0.01 to about 0.3, α ranges from about 0 to about 0.4, β ranges from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof.

9. The lithium ion battery of claim 1 wherein the particulate silicon oxide based active material is preloaded with the lithium by contacting the particulate silicon oxide based active material with electrolyte and a lithium source.

10. The lithium ion battery of claim 9 where the lithium source comprises elemental lithium.

11. The lithium ion battery of claim 1 wherein the particulate silicon oxide based active material is preloaded with the lithium by forming an electrode with the particulate silicon oxide based active material and placing the electrode in a vessel containing electrolyte and a sheet of lithium source material contacting the electrode.

12. The lithium ion battery of claim 1 wherein the silicon oxide carbon composite composition comprises up to 60 wt % graphite.

13. The lithium ion battery of claim 1 wherein the silicon oxide carbon composite composition comprises from 5 wt % to 55 wt % graphite.

14. The lithium ion battery of claim 1 wherein the silicon oxide carbon composite composition comprises from 30 wt % to 45 wt % graphite.

15. The lithium ion battery of claim 1 wherein the negative electrode further comprises polyimide.

16. The lithium ion battery of claim 1 wherein the negative electrode further comprises a binder having an elongation of at least about 50% and a tensile strength of at least about 100 MPa.

17. The lithium ion battery of claim 1 wherein the battery discharge capacity decreases by no more than about 15 percent at a 50th discharge cycle relative to a 7th discharge cycle when discharged at a rate of C/3 from a 7th discharge to a 50th discharge.

18. The lithium ion battery of claim 1 wherein the particulate silicon oxide based active material has a density of at least about 0.6 g/cm$^3$.

19. The lithium ion battery of claim 1 wherein the negative electrode has an average dried thickness of at least about 25 microns and a loading of the particulate silicon oxide based active material of at least about 2 mg/cm$^2$.

20. The lithium ion battery of claim 19 wherein the negative electrode exhibits a capacity per unit area of at least about 3.5 mAh/cm$^2$.

* * * * *